United States Patent
Marriner et al.

(10) Patent No.: US 10,102,040 B2
(45) Date of Patent: Oct. 16, 2018

(54) ADJUSTING VARIABLE LIMIT ON CONCURRENT CODE EXECUTIONS

(71) Applicant: Amazon Technologies, Inc., Seattle, WA (US)

(72) Inventors: Dylan Owen Marriner, Seattle, WA (US); Mauricio Roman, Seattle, WA (US); Marc John Brooker, Seattle, WA (US); Julian Embry Herwitz, Seattle, WA (US); Sean Reque, Seattle, WA (US)

(73) Assignee: Amazon Technologies, Inc, Seattle, WA (US)

( * ) Notice: Subject to any disclaimer, the term of this patent is extended or adjusted under 35 U.S.C. 154(b) by 137 days.

(21) Appl. No.: 15/197,670

(22) Filed: Jun. 29, 2016

(65) Prior Publication Data

US 2018/0004575 A1    Jan. 4, 2018

(51) Int. Cl.
*G06F 9/46* (2006.01)
*G06F 9/50* (2006.01)
*G06F 9/455* (2018.01)

(52) U.S. Cl.
CPC ........ *G06F 9/5077* (2013.01); *G06F 9/45558* (2013.01); *G06F 2009/4557* (2013.01)

(58) Field of Classification Search
None
See application file for complete search history.

(56) References Cited

U.S. PATENT DOCUMENTS 4,949,254 A    8/1990   Shorter
5,283,888 A    2/1994   Dao et al.
(Continued)

FOREIGN PATENT DOCUMENTS

EP    2663052 A1    11/2013
JP    2002287974 A    10/2002
(Continued)

OTHER PUBLICATIONS

Espadas et al. "A tenant-based resource allocation model for scaling Software-as-a-Service applications over cloud computing infrastructures." Future Generation Computer Systems 29,1 (2013): 273-286. Retrieved on [Apr. 21, 2016] Retrieved from the Internet: URLhttp://www.sciencedirect.com/science/articie/pii/S0167739X1100210X.
(Continued)

*Primary Examiner* — Van Nguyen
(74) *Attorney, Agent, or Firm* — Knobbe, Martens, Olson & Bear, LLP

(57) ABSTRACT

Systems and methods are described for adjusting a number of concurrent code executions allowed to be performed for a given user on an on-demand code execution environment or other distributed code execution environments. Such environments utilize pre-initialized virtual machine instances to enable execution of user-specified code in a rapid manner, without delays typically caused by initialization of the virtual machine instances. However, to improve utilization of computing resources, such environments may temporarily restrict the number of concurrent code executions performed on behalf of the given user to a number less than the maximum number of concurrent code executions allowed for the given user. Such environments may adjust the temporary restriction on the number of concurrent code executions based on the number of incoming code execution requests associated with the given user.

20 Claims, 6 Drawing Sheets

(56) References Cited

U.S. PATENT DOCUMENTS

| | | | |
|---|---|---|---|
| 5,970,488 A | 10/1999 | Crowe et al. |
| 6,385,636 B1 | 5/2002 | Suzuki |
| 6,463,509 B1 | 10/2002 | Teoman et al. |
| 6,708,276 B1 | 3/2004 | Yarsa et al. |
| 7,036,121 B1 | 4/2006 | Casabona et al. |
| 7,665,090 B1 | 2/2010 | Tormasov et al. |
| 7,707,579 B2 | 4/2010 | Rodriguez |
| 7,730,464 B2 | 6/2010 | Trowbridge |
| 7,774,191 B2 | 8/2010 | Berkowitz et al. |
| 7,823,186 B2 | 10/2010 | Pouliot |
| 7,886,021 B2 | 2/2011 | Scheifler et al. |
| 8,010,990 B2 | 8/2011 | Ferguson et al. |
| 8,024,564 B2 | 9/2011 | Bassani et al. |
| 8,046,765 B2 | 10/2011 | Cherkasova et al. |
| 8,051,180 B2 | 11/2011 | Mazzaferri et al. |
| 8,051,266 B2 | 11/2011 | DeVal et al. |
| 8,065,676 B1 | 11/2011 | Sahai et al. |
| 8,065,682 B2 | 11/2011 | Baryshnikov et al. |
| 8,095,931 B1 | 1/2012 | Chen et al. |
| 8,127,284 B2 | 2/2012 | Meijer et al. |
| 8,146,073 B2 | 3/2012 | Sinha |
| 8,166,304 B2 | 4/2012 | Murase et al. |
| 8,171,473 B2 | 5/2012 | Lavin |
| 8,209,695 B1 | 6/2012 | Pruyne et al. |
| 8,219,987 B1 | 7/2012 | Vlaovic et al. |
| 8,321,554 B2 | 11/2012 | Dickinson |
| 8,321,558 B1 | 11/2012 | Sirota et al. |
| 8,336,079 B2 | 12/2012 | Budko et al. |
| 8,352,941 B1 * | 1/2013 | Protopopov ........ G06F 9/45558 718/1 |
| 8,429,282 B1 | 4/2013 | Ahuja |
| 8,448,165 B1 | 5/2013 | Conover |
| 8,613,070 B1 | 12/2013 | Borzycki et al. |
| 8,631,130 B2 | 1/2014 | Jackson |
| 8,656,482 B1 * | 2/2014 | Tosa ........................ H04L 63/08 713/153 |
| 8,677,359 B1 | 3/2014 | Cavage et al. |
| 8,694,996 B2 | 4/2014 | Cawlfield et al. |
| 8,719,415 B1 | 5/2014 | Sirota et al. |
| 8,725,702 B1 | 5/2014 | Raman et al. |
| 8,756,696 B1 | 6/2014 | Miller |
| 8,769,519 B2 | 7/2014 | Leitman et al. |
| 8,799,879 B2 | 8/2014 | Wright et al. |
| 8,806,468 B2 | 8/2014 | Meijer et al. |
| 8,819,679 B2 | 8/2014 | Agarwal et al. |
| 8,825,964 B1 | 9/2014 | Sopka et al. |
| 8,904,008 B2 | 12/2014 | Calder et al. |
| 8,997,093 B2 | 3/2015 | Dimitrov |
| 9,027,087 B2 | 5/2015 | Ishaya et al. |
| 9,038,068 B2 | 5/2015 | Engle et al. |
| 9,086,897 B2 | 7/2015 | Oh et al. |
| 9,092,837 B2 | 7/2015 | Bala et al. |
| 9,110,732 B1 | 8/2015 | Forschmiedt et al. |
| 9,112,813 B2 | 8/2015 | Jackson |
| 9,146,764 B1 | 9/2015 | Wagner |
| 9,183,019 B2 | 11/2015 | Kruglick |
| 9,208,007 B2 | 12/2015 | Harper et al. |
| 9,223,561 B2 | 12/2015 | Orveillon et al. |
| 9,223,966 B1 | 12/2015 | Satish et al. |
| 9,250,893 B2 | 2/2016 | Blahaerath et al. |
| 9,298,633 B1 | 3/2016 | Zhao et al. |
| 9,317,689 B2 | 4/2016 | Aissi |
| 9,323,556 B2 | 4/2016 | Wagner |
| 9,361,145 B1 | 6/2016 | Wilson et al. |
| 9,413,626 B2 * | 8/2016 | Reque ...................... G06F 9/445 |
| 9,436,555 B2 | 9/2016 | Dornemann et al. |
| 9,461,996 B2 | 10/2016 | Hayton et al. |
| 9,471,775 B1 | 10/2016 | Wagner et al. |
| 9,483,335 B1 | 11/2016 | Wagner et al. |
| 9,489,227 B2 | 11/2016 | Oh et al. |
| 9,537,788 B2 * | 1/2017 | Reque ...................... G06F 9/445 |
| 9,588,790 B1 | 3/2017 | Wagner et al. |
| 9,600,312 B2 * | 3/2017 | Wagner ............... G06F 9/45533 |
| 9,652,306 B1 | 5/2017 | Wagner et al. |
| 9,652,617 B1 | 5/2017 | Evans et al. |
| 9,661,011 B1 | 5/2017 | Van Horenbeeck et al. |
| 9,678,773 B1 | 6/2017 | Wagner et al. |
| 9,678,778 B1 | 6/2017 | Youseff |
| 9,715,402 B2 | 7/2017 | Wagner et al. |
| 9,727,725 B2 | 8/2017 | Wagner et al. |
| 9,733,967 B2 | 8/2017 | Wagner et al. |
| 9,760,387 B2 | 9/2017 | Wagner et al. |
| 9,785,476 B2 | 10/2017 | Wagner et al. |
| 9,811,363 B1 | 11/2017 | Wagner |
| 9,811,434 B1 | 11/2017 | Wagner |
| 9,830,175 B1 | 11/2017 | Wagner |
| 9,830,193 B1 | 11/2017 | Wagner et al. |
| 9,830,449 B1 | 11/2017 | Wagner |
| 9,910,713 B2 | 3/2018 | Wisniewski et al. |
| 9,928,108 B1 | 3/2018 | Wagner et al. |
| 9,930,103 B2 | 3/2018 | Thompson |
| 2002/0172273 A1 | 11/2002 | Baker et al. |
| 2003/0071842 A1 | 4/2003 | King et al. |
| 2003/0084434 A1 | 5/2003 | Ren |
| 2003/0229794 A1 | 12/2003 | James, II et al. |
| 2004/0098154 A1 | 5/2004 | McCarthy |
| 2004/0249947 A1 | 12/2004 | Novaes et al. |
| 2004/0268358 A1 | 12/2004 | Darling et al. |
| 2005/0044301 A1 | 2/2005 | Vasilevsky et al. |
| 2005/0132167 A1 | 6/2005 | Longobardi |
| 2005/0132368 A1 | 6/2005 | Sexton et al. |
| 2005/0193113 A1 | 9/2005 | Kokusho et al. |
| 2005/0193283 A1 | 9/2005 | Reinhardt et al. |
| 2005/0257051 A1 | 11/2005 | Richard |
| 2006/0123066 A1 | 6/2006 | Jacobs et al. |
| 2006/0129684 A1 | 6/2006 | Datta |
| 2006/0184669 A1 | 8/2006 | Vaidyanathan et al. |
| 2006/0200668 A1 | 9/2006 | Hybre et al. |
| 2006/0212332 A1 | 9/2006 | Jackson |
| 2006/0242647 A1 | 10/2006 | Kimbrel et al. |
| 2006/0248195 A1 | 11/2006 | Toumura et al. |
| 2007/0094396 A1 | 4/2007 | Takano et al. |
| 2007/0130341 A1 | 6/2007 | Ma |
| 2007/0255604 A1 | 11/2007 | Seelig |
| 2008/0028409 A1 | 1/2008 | Cherkasova et al. |
| 2008/0082977 A1 | 4/2008 | Araujo et al. |
| 2008/0104247 A1 | 5/2008 | Venkatakrishnan et al. |
| 2008/0104608 A1 | 5/2008 | Hyser et al. |
| 2008/0126110 A1 | 5/2008 | Haeberle et al. |
| 2008/0126486 A1 | 5/2008 | Heist |
| 2008/0189468 A1 | 8/2008 | Schmidt et al. |
| 2008/0201711 A1 | 8/2008 | Amir Husain |
| 2009/0013153 A1 | 1/2009 | Hilton |
| 2009/0025009 A1 | 1/2009 | Brunswig et al. |
| 2009/0055810 A1 | 2/2009 | Kondur |
| 2009/0055829 A1 | 2/2009 | Gibson |
| 2009/0070355 A1 | 3/2009 | Cadarette et al. |
| 2009/0077569 A1 | 3/2009 | Appleton et al. |
| 2009/0125902 A1 | 5/2009 | Ghosh et al. |
| 2009/0158275 A1 | 6/2009 | Wang et al. |
| 2009/0193410 A1 | 7/2009 | Arthursson et al. |
| 2009/0198769 A1 | 8/2009 | Keller et al. |
| 2009/0204964 A1 | 8/2009 | Foley et al. |
| 2009/0288084 A1 | 11/2009 | Astete et al. |
| 2009/0300599 A1 | 12/2009 | Piotrowski |
| 2010/0023940 A1 | 1/2010 | Iwamatsu et al. |
| 2010/0031274 A1 | 2/2010 | Sim-Tang |
| 2010/0031325 A1 | 2/2010 | Maigne et al. |
| 2010/0036925 A1 | 2/2010 | Haffner |
| 2010/0064299 A1 | 3/2010 | Kacin et al. |
| 2010/0070678 A1 | 3/2010 | Zhang et al. |
| 2010/0070725 A1 | 3/2010 | Prahlad et al. |
| 2010/0114825 A1 | 5/2010 | Siddegowda |
| 2010/0115098 A1 | 5/2010 | De Baer et al. |
| 2010/0122343 A1 | 5/2010 | Ghosh |
| 2010/0131959 A1 | 5/2010 | Spiers et al. |
| 2010/0186011 A1 | 7/2010 | Magenheimer |
| 2010/0198972 A1 | 8/2010 | Umbehocker |
| 2010/0199285 A1 | 8/2010 | Medovich |
| 2010/0257116 A1 | 10/2010 | Mehta et al. |
| 2010/0269109 A1 | 10/2010 | Cartales |
| 2011/0010722 A1 | 1/2011 | Matsuyama |
| 2011/0029970 A1 | 2/2011 | Arasaratnam |
| 2011/0055378 A1 | 3/2011 | Ferris et al. |

(56) References Cited

U.S. PATENT DOCUMENTS

| | | |
|---|---|---|
| 2011/0055396 A1 | 3/2011 | DeHaan |
| 2011/0078679 A1 | 3/2011 | Bozek et al. |
| 2011/0099551 A1 | 4/2011 | Fahrig et al. |
| 2011/0131572 A1 | 6/2011 | Elyashev et al. |
| 2011/0134761 A1 | 6/2011 | Smith |
| 2011/0141124 A1 | 6/2011 | Halls et al. |
| 2011/0153727 A1 | 6/2011 | Li |
| 2011/0153838 A1 | 6/2011 | Belkine et al. |
| 2011/0154353 A1 | 6/2011 | Theroux et al. |
| 2011/0179162 A1 | 7/2011 | Mayo et al. |
| 2011/0184993 A1 | 7/2011 | Chawla et al. |
| 2011/0225277 A1 | 9/2011 | Freimuth et al. |
| 2011/0231680 A1 | 9/2011 | Padmanabhan et al. |
| 2011/0247005 A1 | 10/2011 | Benedetti et al. |
| 2011/0265164 A1 | 10/2011 | Lucovsky |
| 2011/0314465 A1 | 12/2011 | Smith et al. |
| 2011/0321033 A1 | 12/2011 | Kelkar et al. |
| 2012/0016721 A1 | 1/2012 | Weinman |
| 2012/0041970 A1 | 2/2012 | Ghosh et al. |
| 2012/0054744 A1 | 3/2012 | Singh et al. |
| 2012/0072914 A1 | 3/2012 | Ota |
| 2012/0096271 A1 | 4/2012 | Ramarathinam et al. |
| 2012/0096468 A1 | 4/2012 | Chakravorty et al. |
| 2012/0102307 A1 | 4/2012 | Wong |
| 2012/0102333 A1 | 4/2012 | Wong |
| 2012/0110155 A1 | 5/2012 | Adlung et al. |
| 2012/0110164 A1 | 5/2012 | Frey et al. |
| 2012/0110588 A1 | 5/2012 | Bieswanger et al. |
| 2012/0131379 A1 | 5/2012 | Tameshige et al. |
| 2012/0192184 A1 | 7/2012 | Burckart et al. |
| 2012/0197958 A1 | 8/2012 | Nightingale et al. |
| 2012/0233464 A1 | 9/2012 | Miller et al. |
| 2012/0331113 A1 | 12/2012 | Jain et al. |
| 2013/0014101 A1 | 1/2013 | Ballani et al. |
| 2013/0042234 A1 | 2/2013 | DeLuca et al. |
| 2013/0054804 A1 | 2/2013 | Jana et al. |
| 2013/0054927 A1 | 2/2013 | Raj et al. |
| 2013/0055262 A1 | 2/2013 | Lubsey et al. |
| 2013/0061208 A1 | 3/2013 | Tsao et al. |
| 2013/0067494 A1 | 3/2013 | Srour et al. |
| 2013/0080641 A1 | 3/2013 | Lui et al. |
| 2013/0097601 A1 | 4/2013 | Podvratnik et al. |
| 2013/0111469 A1 | 5/2013 | B et al. |
| 2013/0132942 A1 | 5/2013 | Wang |
| 2013/0139152 A1 | 5/2013 | Chang et al. |
| 2013/0139166 A1 | 5/2013 | Zhang et al. |
| 2013/0151648 A1 | 6/2013 | Luna |
| 2013/0179574 A1 | 7/2013 | Calder et al. |
| 2013/0179881 A1 | 7/2013 | Calder et al. |
| 2013/0179894 A1 | 7/2013 | Calder et al. |
| 2013/0185729 A1 | 7/2013 | Vasic et al. |
| 2013/0191924 A1 | 7/2013 | Tedesco |
| 2013/0198319 A1 | 8/2013 | Shen et al. |
| 2013/0198743 A1 | 8/2013 | Kruglick |
| 2013/0205092 A1 | 8/2013 | Roy et al. |
| 2013/0219390 A1 | 8/2013 | Lee et al. |
| 2013/0227097 A1 | 8/2013 | Yasuda et al. |
| 2013/0227563 A1 | 8/2013 | Mcgrath |
| 2013/0227641 A1 | 8/2013 | White et al. |
| 2013/0232480 A1 | 9/2013 | Winterfeldt et al. |
| 2013/0239125 A1 | 9/2013 | Iorio |
| 2013/0262556 A1 | 10/2013 | Xu et al. |
| 2013/0263117 A1 | 10/2013 | Konik et al. |
| 2013/0275975 A1 | 10/2013 | Masuda et al. |
| 2013/0290538 A1 | 10/2013 | Gmach et al. |
| 2013/0297964 A1 | 11/2013 | Hegdal et al. |
| 2013/0339950 A1 | 12/2013 | Ramarathinam et al. |
| 2013/0346946 A1 | 12/2013 | Pinnix |
| 2013/0346964 A1 | 12/2013 | Nobuoka et al. |
| 2013/0346987 A1 | 12/2013 | Raney et al. |
| 2013/0346994 A1 | 12/2013 | Chen et al. |
| 2013/0347095 A1 | 12/2013 | Barjatiya et al. |
| 2014/0007097 A1 | 1/2014 | Chin et al. |
| 2014/0019965 A1 | 1/2014 | Neuse et al. |
| 2014/0019966 A1 | 1/2014 | Neuse et al. |
| 2014/0040343 A1 | 2/2014 | Nickolov et al. |
| 2014/0040857 A1 | 2/2014 | Trinchini et al. |
| 2014/0040880 A1 | 2/2014 | Brownlow et al. |
| 2014/0059226 A1 | 2/2014 | Messerli et al. |
| 2014/0068611 A1 | 3/2014 | McGrath et al. |
| 2014/0082165 A1 | 3/2014 | Marr et al. |
| 2014/0101649 A1 | 4/2014 | Kamble et al. |
| 2014/0109087 A1 | 4/2014 | Jujare et al. |
| 2014/0109088 A1 | 4/2014 | Dournov et al. |
| 2014/0129667 A1 | 5/2014 | Ozawa |
| 2014/0130040 A1 | 5/2014 | Lemanski |
| 2014/0173614 A1 | 6/2014 | Konik et al. |
| 2014/0173616 A1 | 6/2014 | Bird et al. |
| 2014/0180862 A1 | 6/2014 | Certain et al. |
| 2014/0189677 A1 | 7/2014 | Curzi et al. |
| 2014/0201735 A1 | 7/2014 | Kannan et al. |
| 2014/0207912 A1 | 7/2014 | Thibeault |
| 2014/0215073 A1 | 7/2014 | Dow et al. |
| 2014/0245297 A1 | 8/2014 | Hackett |
| 2014/0279581 A1 | 9/2014 | Devereaux |
| 2014/0280325 A1 | 9/2014 | Krishnamurthy et al. |
| 2014/0282615 A1 | 9/2014 | Cavage et al. |
| 2014/0289286 A1 | 9/2014 | Gusak |
| 2014/0304698 A1 | 10/2014 | Chigurapati et al. |
| 2014/0304815 A1 | 10/2014 | Maeda |
| 2014/0380085 A1 | 12/2014 | Rash et al. |
| 2015/0039891 A1 | 2/2015 | Ignatchenko et al. |
| 2015/0074659 A1 | 3/2015 | Madsen et al. |
| 2015/0081885 A1 | 3/2015 | Thomas et al. |
| 2015/0106805 A1 | 4/2015 | Melander et al. |
| 2015/0120928 A1 | 4/2015 | Gummaraju et al. |
| 2015/0135287 A1 | 5/2015 | Medeiros et al. |
| 2015/0143381 A1 | 5/2015 | Chin et al. |
| 2015/0178110 A1 | 6/2015 | Li et al. |
| 2015/0186129 A1 | 7/2015 | Apte et al. |
| 2015/0235144 A1 | 8/2015 | Gusev et al. |
| 2015/0242225 A1 | 8/2015 | Muller et al. |
| 2015/0256621 A1 | 9/2015 | Noda et al. |
| 2015/0261578 A1 | 9/2015 | Greden et al. |
| 2015/0289220 A1 | 10/2015 | Kim et al. |
| 2015/0309923 A1 | 10/2015 | Iwata et al. |
| 2015/0319160 A1 | 11/2015 | Ferguson et al. |
| 2015/0332048 A1 | 11/2015 | Mooring et al. |
| 2015/0350701 A1 | 12/2015 | Lemus et al. |
| 2015/0363181 A1 | 12/2015 | Alberti et al. |
| 2015/0371244 A1 | 12/2015 | Neuse et al. |
| 2015/0378764 A1 | 12/2015 | Sivasubramanian et al. |
| 2015/0378765 A1 | 12/2015 | Singh et al. |
| 2016/0012099 A1 | 1/2016 | Tuatini et al. |
| 2016/0052258 A1 | 2/2016 | Durst et al. |
| 2016/0072727 A1 | 3/2016 | Leafe et al. |
| 2016/0092250 A1 | 3/2016 | Wagner et al. |
| 2016/0092252 A1 | 3/2016 | Wagner |
| 2016/0098285 A1 | 4/2016 | Davis et al. |
| 2016/0100036 A1 | 4/2016 | Lo et al. |
| 2016/0117254 A1 | 4/2016 | Susarla et al. |
| 2016/0140180 A1 | 5/2016 | Park et al. |
| 2016/0285906 A1 | 9/2016 | Fine et al. |
| 2016/0292016 A1 | 10/2016 | Bussard et al. |
| 2016/0294614 A1 | 10/2016 | Searle et al. |
| 2016/0364265 A1 | 12/2016 | Cao et al. |
| 2016/0371127 A1 | 12/2016 | Antony et al. |
| 2016/0378554 A1 | 12/2016 | Gummaraju et al. |
| 2017/0083381 A1 | 3/2017 | Cong et al. |
| 2017/0085447 A1 | 3/2017 | Chen et al. |
| 2017/0090961 A1 | 3/2017 | Wagner et al. |
| 2017/0093920 A1 | 3/2017 | Ducatel et al. |
| 2017/0116051 A1 | 4/2017 | Wagner et al. |
| 2017/0177391 A1 | 6/2017 | Wagner et al. |
| 2017/0192804 A1 | 7/2017 | Wagner |
| 2017/0199766 A1 | 7/2017 | Wagner et al. |
| 2017/0206116 A1 | 7/2017 | Reque et al. |
| 2017/0286143 A1 | 10/2017 | Wagner et al. |
| 2017/0286156 A1 | 10/2017 | Wagner et al. |
| 2017/0371703 A1 | 12/2017 | Wagner et al. |
| 2017/0371706 A1 | 12/2017 | Wagner et al. |
| 2017/0371724 A1 | 12/2017 | Wagner et al. |
| 2018/0004553 A1 | 1/2018 | Wagner et al. |

(56) References Cited

U.S. PATENT DOCUMENTS

| | | |
|---|---|---|
| 2018/0004572 A1 | 1/2018 | Wagner et al. |
| 2018/0039506 A1 | 2/2018 | Wagner et al. |
| 2018/0121245 A1 | 5/2018 | Wagner et al. |

FOREIGN PATENT DOCUMENTS

| | | |
|---|---|---|
| JP | 2006-107599 A | 4/2006 |
| JP | 2011257847 A | 12/2011 |
| WO | WO 2008/114454 A1 | 9/2008 |
| WO | WO 2009/137567 A1 | 11/2009 |
| WO | WO 2015/078394 A1 | 6/2015 |
| WO | WO 2015/108539 A1 | 7/2015 |
| WO | WO 2016/053950 A1 | 4/2016 |
| WO | WO 2016/053968 A1 | 4/2016 |
| WO | WO 2016/053973 A1 | 4/2016 |
| WO | WO 2016/090292 A1 | 6/2016 |
| WO | WO 2016/126731 A1 | 8/2016 |
| WO | WO 2016/164633 A1 | 10/2016 |
| WO | WO 2016/164638 A1 | 10/2016 |
| WO | WO 2017/112526 A1 | 6/2017 |
| WO | WO 2017/172440 A1 | 10/2017 |

OTHER PUBLICATIONS

Vaquero, et al. "Dynamically scaling applications in the cloud." ACM SIGCOMM Computer Communication Review 41.1 (2011): pp. 45-52. Retrieved on [Apr. 21, 2016] Retrieved from the Internet: URL<http://dl.acm.org/citation.cfm?id=1925869>.
International Search Report and Written Opinion in PCT/US2015/052810dated Dec. 17, 2015, 18 pages.
International Search Report and Written Opinion in PCT/US2015/052838 dated Dec. 18, 2015, 23 pages.
International Search Report and Written Opinion in PCT/US2015/052833dated Jan. 13, 2016, 17 pages.
International Search Report and Written Opinion in PCT/US2015/064071dated Mar. 16, 2016, 17 pages.
International Search Report and Written Opinion in PCT/US2016/016211dated Apr. 13, 2016 11 pages.
Anonymous: "Docker run reference", Dec. 7, 2015, XP055350246, Retrieved from the Internet: URL:https://web.archive.org/web/20151207111702/https://docs.docker.com/engine/reference/run/ [retrieved on Feb. 28, 2017].
Adapter Pattern, Wikipedia, https://en.wikipedia.org/w/index.php?title=Adapter_pattern&oldid=654971255, [retrieved May 26, 2016], 6 pages.
Amazon, "AWS Lambda: Developer Guide", Retrieved from the Internet, Jun. 26, 2016, URL : http://docs.aws.amazon.com/lambda/latest/dg/lambda-dg.pdf.
Balazinska et al., Moirae: History-Enhanced Monitoring, Published: 2007, 12 pages.
Ben-Yehuda et al., "Deconstructing Amazon EC2 Spot Instance Pricing", ACM Transactions on Economics and Computation 1.3, 2013, 15 pages.
Czajkowski, G., and L. Daynes, Multitasking Without Compromise: A Virtual Machine Evolution 47(4a):60-73, ACM SIGPLAN Notices—Supplemental Issue, Apr. 2012.
Das et al., Adaptive Stream Processing using Dynamic Batch Sizing, 2014, 13 pages.
Dombrowski, M., et al., Dynamic Monitor Allocation in the Java Virtual Machine, JTRES '13, Oct. 9-11, 2013, pp. 30-37.
Espadas, J., et al., A Tenant-Based Resource Allocation Model for Scaling Software-as-a-Service Applications Over Cloud Computing Infrastructures, Future Generation Computer Systems, vol. 29, pp. 273-286, 2013.
Hoffman, Auto scaling your website with Amazon Web Services (AWS)—Part 2, Cardinalpath, Sep. 2015, 15 pages.
Nakajima, J., et al., Optimizing Virtual Machines Using Hybrid Virtualization, SAC '11, Mar. 21-25, 2011, TaiChung, Taiwan, pp. 573-578.
Qian, H., and D. Medhi, et al., Estimating Optimal Cost of Allocating Virtualized Resources With Dynamic Demand, ITC 2011, Sep. 2011, pp. 320-321.
Shim (computing), Wikipedia, https://en.wikipedia.org/w/index.php?title+Shim_(computing)&oldid+654971528, [retrieved on May 26, 2016], 2 pages.
Vaghani, S.B., Virtual Machine File System, ACM SIGOPS Operating Systems Review 44(4):57-70, Dec. 2010.
Vaquero, L., et al., Dynamically Scaling Applications in the cloud, ACM SIGCOMM Computer Communication Review 41(1):45-52, Jan. 2011.
Yue et al., AC 2012-4107: Using Amazon EC2 in Computer and Network Security Lab Exercises: Design, Results, and Analysis, 2012, American Society for Engineering Education 2012.
Zheng, C., and D. Thain, Integrating Containers into Workflows: A Case Study Using Makeflow, Work Queue, and Docker, VTDC '15, Jun. 15, 2015, Portland, Oregon, pp. 31-38.
International Search Report and Written Opinion in PCT/US2015/052810 dated Dec. 17, 2015.
International Preliminary Report on Patentability in PCT/US2015/052810 dated Apr. 4, 2017.
International Search Report and Written Opinion in PCT/US2015/052838 dated Dec. 18, 2015.
International Preliminary Report on Patentability in PCT/US2015/052838 dated Apr. 4, 2017.
International Search Report and Written Opinion in PCT/US2015/052833 dated Jan. 13, 2016.
International Preliminary Report on Patentability in PCT/US2015/052833 dated Apr. 4, 2017.
International Search Report and Written Opinion in PCT/US2015/064071dated Mar. 16, 2016.
International Preliminary Report on Patentability in PCT/US2015/064071 dated Jun. 6, 2017.
International Search Report and Written Opinion in PCT/US2016/016211 dated Apr. 13, 2016.
International Preliminary Report on Patentability in PCT/US2016/016211 dated Aug. 17, 2017.
International Search Report and Written Opinion in PCT/US2016/026514 dated Jun. 8, 2016.
International Preliminary Report on Patentability in PCT/US2016/026514 dated Oct. 10, 2017.
International Search Report and Written Opinion in PCT/US2016/026520 dated Jul. 5, 2016.
International Preliminary Report on Patentability in PCT/US2016/026520 dated Oct. 10, 2017.
International Search Report and Written Opinion in PCT/US2016/054774 dated Dec. 16, 2016.
International Search Report and Written Opinion in PCT/US2016/066997 dated Mar. 20, 2017.
International Search Report and Written Opinion in PCT/US/2017/023564 dated Jun. 6, 2017.
International Search Report and Written Opinion in PCT/US2017/040054 dated Sep. 21, 2017.
International Search Report and Written Opinion in PCT/US2017/039514 dated Oct. 10, 2017.

* cited by examiner

US 10,102,040 B2

ADJUSTING VARIABLE LIMIT ON CONCURRENT CODE EXECUTIONS

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Introduction

Figure 1:
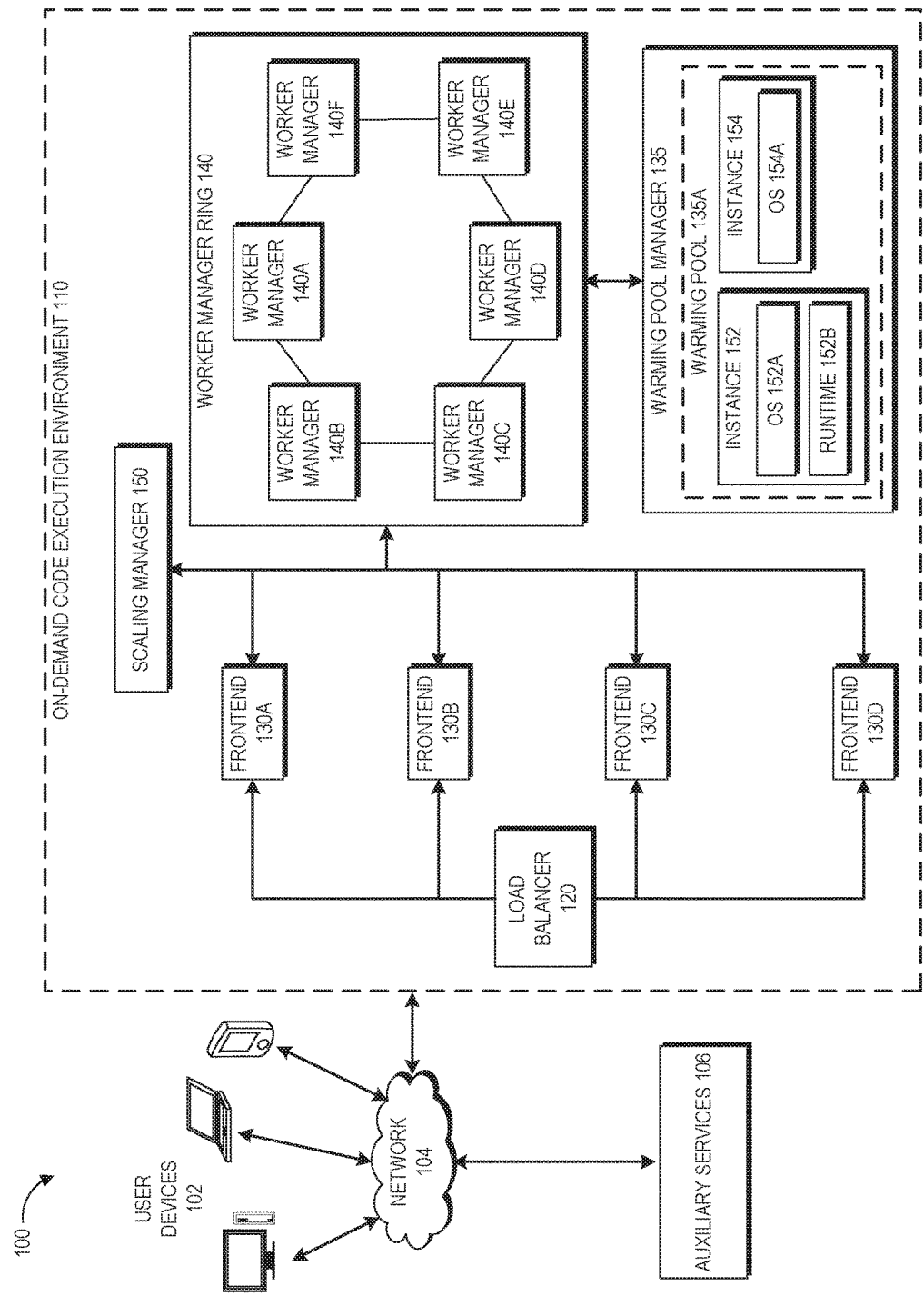
FIG. 1 is a block diagram depicting an illustrative environment in which an on-demand code execution environment can operate.

Companies and organizations no longer need to acquire and manage their own data centers in order to perform computing operations (e.g., execute code, including threads, programs, functions, software, routines, subroutines, processes, etc.). With the advent of cloud computing, storage space and compute power traditionally provided by hardware computing devices can now be obtained and configured in minutes over the Internet. Thus, developers can quickly purchase a desired amount of computing resources without having to worry about acquiring physical machines. Such computing resources are typically purchased in the form of virtual computing resources, or virtual machine instances. These instances of virtual machines are software implementations of physical machines (e.g., computers), which are hosted on physical computing devices, and may contain operating systems and applications that are traditionally provided on physical machines. These virtual machine instances are configured with a set of computing resources (e.g., memory, CPU, disk, network, etc.) that applications running on the virtual machine instances may request and can be utilized in the same manner as physical computers.

However, even when virtual computing resources are purchased, developers still have to decide how many and what type of virtual machine instances to purchase, and how long to keep them. For example, the costs of using the virtual machine instances may vary depending on the type and the number of hours they are rented. In addition, the minimum time a virtual machine may be rented is typically on the order of hours. Further, developers have to specify the hardware and software resources (e.g., type of operating systems and language runtimes, etc.) to install on the virtual machines. Other concerns that they might have include over-utilization (e.g., acquiring too little computing resources and suffering performance issues), under-utilization (e.g., acquiring more computing resources than necessary to run the codes, and thus overpaying), prediction of change in traffic (e.g., so that they know when to scale up or down), and instance and language runtime startup delay, which can take 3-10 minutes, or longer, even though users may desire computing capacity on the order of seconds or even milliseconds.

On-Demand Code Execution Environment

Generally described, aspects of the present disclosure relate to managing execution of code on an on-demand code execution environment, and more specifically, to automatically adjusting the maximum number of concurrent code executions on the on-demand code execution environment. Further, aspects of the present disclosure relate to distributing code executions across virtual machines, based on the entities associated with the code execution, to increase the efficiency at which large volumes of code can be executed while maintaining the security of execution with respect to those entities. As described in detail herein, an on-demand code execution environment may provide a network-accessible service enabling users (also sometimes referred to herein as "clients") to submit or designate computer-executable code to be executed by virtual machine instances on the on-demand code execution environment. The on-demand code execution environment can further enable users to trigger execution of a task based on a variety of potential events, such as transmission of an application programming interface ("API") call or a specially formatted hypertext transport protocol ("HTTP") packet. Thus, users may utilize the on-demand code execution environment to execute any specified executable code "on-demand," without requiring configuration or maintenance of the underlying hardware or infrastructure on which the code is executed. Further, the on-demand code execution environment may be configured to begin executing the code in a rapid manner (e.g., within 100 milliseconds [ms] after receiving the request to execute the code), thus enabling code executions in "real-time" (e.g., with little or no perceptible delay to an end user). To enable this rapid execution, the on-demand code execution environment can include a group of virtual machine instances that are "pre-warmed" or pre-initialized (e.g., booted into an operating system and executing a complete or substantially complete runtime environment), also referred to herein as a "warming pool," and configured to enable execution of user-defined code, such that the code may be rapidly executed in response to a request to execute the code, without delay caused by initializing the virtual machine instance. Thus, when an execution of a program code is requested, a pre-initialized virtual machine can begin executing the program code in a very short amount of time.

Specific embodiments and example applications of the present disclosure will now be described with reference to the drawings. These embodiments and example applications are intended to illustrate, and not limit, the present disclosure.

Virtual Environment

With reference to FIG. 1, a block diagram illustrating an embodiment of a virtual environment 100 will be described. The virtual environment 100 of FIG. 1 includes user computing devices 102, auxiliary services 106, and an on-demand code execution environment 110, connected to each other via a network 104. In the virtual environment 100, users (e.g., developers, etc.) of user computing devices 102 may run various program codes using the virtual computing resources provided by the on-demand code execution environment 110 and/or the auxiliary services 106.

Components of On-Demand Code Execution Environment

In the environment illustrated FIG. 1, the on-demand code execution environment 110 includes a load balancer 120, frontends 130A-130D, a warming pool manager 135, and a worker manager ring 140.

The load balancer 120 serves as a front door to all the other services provided by the on-demand code execution environment 110. The load balancer 120 processes requests to execute user code on the on-demand code execution environment 110 and handles the first level of load balancing across the frontends 130. For example, the load balancer 120 may distribute the requests among the frontends 130 (e.g., based on the individual capacity of the frontends 130). In one embodiment, the requests are distributed evenly across the frontends 130.

The frontend 130 receives requests to execute user code on the on-demand code execution environment 110 that have been processed by the load balancer 120. The frontend 130 causes the appropriate worker managers in the worker manager ring 140 to handle the received requests. Although not illustrated in FIG. 1, the frontend 130 may communicate directly with workers (e.g., virtual machine instances) managed and acquired by the worker managers to cause the workers to execute the program codes based on the received requests. For example, upon receiving, from a frontend, a request to acquire a worker that can be used to handle an incoming code execution request, the worker manager may identify an available worker from either the active pool(s) of virtual machine instances or the warming pool(s) of virtual machine instances ready to be assigned to a user. The worker manager may forward information (e.g., identity, IP address, etc.) regarding the worker to the frontend. Upon receiving the information from the worker manager, the frontend can send a request to the identified worker to execute the program code associated with the incoming code execution request.

The warming pool manager 135 facilitates allocation and configuration of compute capacity (e.g., virtual machine instances, containers, etc.). The warming pool manager 135 "pre-warms" (e.g., initializes prior to receipt of code execution requests) virtual machine instances to enable requested code executions to be performed quickly, without the delay caused by initialization of the virtual machines.

The worker manager ring 140 includes worker managers for managing active virtual machine instances (e.g., currently assigned to a user and/or executing program codes of the user). The worker managers manage the virtual machine instances used for servicing incoming code execution requests. For example, the frontend 130 may request a worker manager to acquire compute capacity, and in response, the worker manager may locate a virtual machine instance that can be used to handle the "the frontend 130" (e.g., virtual machine instances) and The components of the on-demand code execution environment 110 are described in greater detail below.

High-Level Description of On-Demand Code Execution Environment

A user on a user computing device 102 can send, via the network 104, a request to execute a program code associated with the user on the on-demand code execution environment 110. Upon receiving the request, a load balancer 120 for distributing the incoming code execution requests across a plurality of frontends 130 forwards the request to a selected frontend 130. The selected frontend 130 causes the request to be handled by a worker manager assigned to the user. The worker manager manages the code execution, keeping track of, for example, which code is executing in which container created on which the virtual machine instance associated which user at what time. The on-demand code execution environment 110 further includes a scaling manager 150 for providing improved scaling of the set of worker managers assigned to the user that results in improved resource utilization and other processing advantages.

Scaling Manager

The scaling manager 150 manages the scaling of the one or more worker managers assigned to a given user. The illustration of the scaling manager 150 in FIG. 1 is logical in nature, and one or more of the components of the scaling manager 150 can be implemented by other components of the on-demand code execution environment 110, such as the frontends 130 and/or the worker managers. One or more processes or techniques described herein as being performed by the scaling manager 150 may instead be performed by a frontend or a worker manager illustrated in FIG. 1. Additionally or alternatively, one or more processes or techniques described herein as being performed by a frontend or a worker manager may instead be performed by the scaling manager 150.

Concurrency Limit

In some implementations, the on-demand code execution environment 110 may limit the number of concurrent code executions that a user can have at any given time. Such a limit is referred to herein as a concurrency limit. For example, if a user's concurrency limit is 100, the user may be allowed to have up to 100 code executions running concurrently in the on-demand code execution environment 110.

Advantages of Concentrating Code Execution Requests

As illustrated in FIG. 1, the worker manager ring 140 includes a plurality of worker managers. In some embodiments, the frontend 130 sends each incoming code execution request associated with a given user to only the user's predefined subset of the plurality of worker managers in the worker manager ring 140 (also referred to herein as the user's "arc"), where the subset does not include all of the plurality of worker managers in the worker manager ring 140. By doing so, the code execution requests associated with the given user are concentrated in a smaller number of worker managers, allowing the worker managers to handle such requests more efficiently based on the amount of information that the worker managers have access to about the given user and the given user's prior requests.

Relationship Between Worker Managers and Concurrency Limit

The number of worker managers assigned to a given user may be determined based on the concurrency limit associated with the user. For example, each worker manager in the worker manager ring 140 may be configured to handle up to 50 requests per user. In other words, each worker manager may be associated with a per-user concurrency limit of 50. In such an example, if a user has a concurrency limit of 100, the user is assigned two worker managers, and the user's code execution requests are routed to one of the two worker managers. Similarly, if the user has a concurrency limit of 1000, the user is assigned 20 worker managers for handling the user's code execution requests.

Figure 2:
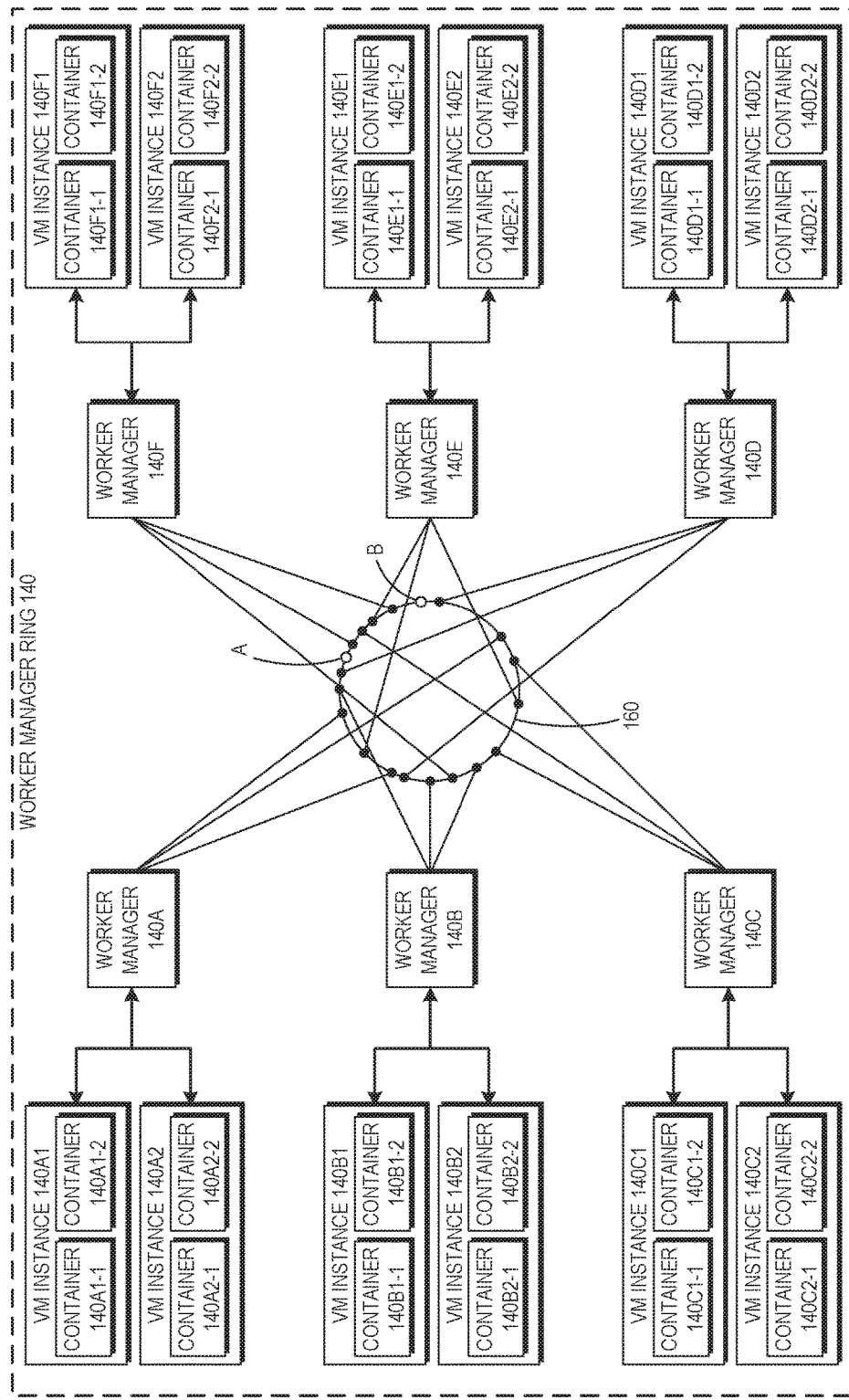
FIG. 2 is a block diagram depicting an example configuration of a worker manager ring of FIG. 1.

In some embodiments, the scaling manager 150 may increase or decrease the per-user concurrency limit if a threshold condition is satisfied (e.g., if all of the worker managers in the worker manager ring illustrated in FIG. 2 are at the per-user capacity or above a threshold utilization level). The scaling manager 150 may also increase the per-user concurrency limit for a given user if the user has a concurrency limit that exceeds the total capacity of the worker manager ring 140 (e.g., [per-user concurrency limit of each worker manager]*[# of worker managers on the ring]).

In some embodiments, the scaling manager 150 may purposely assign to a user a number of worker managers whose collective per-user concurrency limit is less than the concurrency limit of the user. For example, if the user has a concurrency limit of 1000 and if the per-user concurrency limit of each worker manager is 50, the scaling manager 150 may assign less than 20 worker managers to the user for handling the user's code execution requests.

Routing by Frontend

The frontends 130 may distribute code execution requests across the worker managers in the worker manager ring 140 according to a method that is different from the method used by the load balancer 120 to distribute the code execution requests across the frontends 130. In some embodiments, the frontends 130 route the requests to a specific worker manager based on the user code and/or based on the user associated with the user code. In some embodiments, the routing is determined based on a consistent-hashing scheme in which one or more parameters associated with the request (e.g., user ID, user code ID, etc.) are hashed according to a hash function and the request is sent to one of the worker managers in the worker manager ring 140 that has previously been assigned to the sections of a hash ring (e.g., containing a plurality of hash values) that corresponds to the resulting hash value. For example, the worker managers occupy one or more sections of the hash ring, and the requests are mapped to those same hash values. In some embodiments, the hash values may be integer values, and each worker manager may be associated with one or more integer values. The one or more integer values associated with a particular worker manager may be determined based on one or more parameters associated with the worker manager (e.g., IP address, instance ID, etc.). In some embodiments, the request may be sent to the worker manager whose associated integer values are closest to, but not larger than, the hash value calculated for that request (e.g., using modulo arithmetic).

Worker Manager Ring

Turning now to FIG. 2, an example of the worker manager ring 140 will be described. As illustrated in FIG. 2, the worker manager ring 140 includes worker managers 140A, 140B, 140C, 140D, 140E, 140F. The worker manager 140A includes VM instances 140A1, 140A2, which include containers 140A1-1, 140A1-2 and containers 140A2-1, 140A2-2, respectively. The worker manager 140B includes VM instances 140B1, 140B2, which include containers 140B1-1, 140B1-2 and containers 140B2-1, 140B2-2, respectively. The worker manager 140C includes VM instances 140C1, 140C2, which include containers 140C1-1, 140C1-2 and containers 140C2-1, 140C2-2, respectively. The worker manager 140D includes VM instances 140D1, 140D2, which include containers 140D1-1, 140D1-2 and containers 140D2-1, 140D2-2, respectively. The worker manager 140E includes VM instances 140E1, 140E2, which include containers 140E1-1, 140E1-2 and containers 140E2-1, 140E2-2, respectively. The worker manager 140F includes VM instances 140F1, 140F2, which include containers 140F1-1, 140F1-2 and containers 140F2-1, 140F2-2, respectively.

As illustrated in FIG. 2, the worker managers are mapped onto various points on a hash ring 160. In the example of FIG. 2, each worker manager is associated with 3 points on the hash ring 160. In one embodiment, when a request is routed to the worker manager ring 140, a hash value corresponding to a point on the hash ring 160 is calculated for the request, The particular worker manager to which the request is routed may be determined based on the location of the calculated hash value on the hash ring 160. In some embodiments, the particular worker manager to which the request is routed is the one having a point on the hash ring 160 that is closest to the location of the calculated hash value of the request in the clockwise direction. For example, if the hash value calculated for "Request A" corresponds to Point A illustrated on the hash ring 160, "Request A" would be routed to the worker manager 140F. In another example, if the hash value calculated for "Request B" corresponds to Point B illustrated on the hash ring 160, "Request B" would be routed to the worker manager 140D. The worker manager ring 140 of the on-demand code execution environment 110 is not limited to the example illustrated in FIG. 2, and the worker manager ring 140 may be implemented with any number of worker managers, VM instances, and containers, and each worker manager may have any number of points or locations on the hash ring 160 assigned thereto. Although the hash ring 160 is used in the example of FIG. 2 to route the requests to the various worker managers, other request distribution schemes (e.g., rendezvous hashing) may be utilized without departing from the spirit of the present disclosure.

Removal and Addition of Worker Managers

When the frontends 130 determine that one or more worker managers have become unavailable, the frontends 130 may associate the hash values previously associated with the one or more worker managers that have become unavailable with one or more available worker managers in the worker manager ring 140. Similarly, when a new worker manager is added to the worker manager ring 140, the new worker manager may take a share of the hash values associated with the existing worker managers. For example, the new worker manager may be assigned one or more sections of the hash ring that were previously assigned to the existing worker managers. In some embodiments, the new worker manager may be assigned to one or more values previously unassigned to any existing worker managers. The one or more hash values associated with a worker manager may be altered to improve overall utilization across the individual worker managers on the ring.

Actual Utilization and Concurrency Limit

In some cases, a user may always be near his or her concurrency limit. In such cases, it may be beneficial to have a number of worker managers assigned to the user that can sufficiently handle a number of concurrent code executions at or near the concurrency limit.

In other cases, a user may reach only a fraction of the concurrency limit for the majority of the time. In such cases, some of the computing resources managed by the individual worker manager may be wasted if worker managers sufficient to handle concurrent code executions at or near the concurrency limit of the user are constantly waiting for code execution requests from the user. In some embodiments, each worker manager may need to have at least one virtual machine instance provisioned and ready to handle incoming code execution requests, even if the user is sending code execution requests at a rate that results in no concurrent code executions or only a small number of concurrent code executions. For example, if the user has a concurrency limit of 100, and the number of worker managers sufficient to handle 100 concurrent code executions is two, but the code execution requests sent by the user are not resulting in any concurrent code executions (e.g., because the user is sending subsequent code execution requests after prior code executions have been completed), it would be wasteful to have two worker managers each manage a separate virtual machine instance because a single worker manager working with a single virtual machine instance could handle the user's requests more efficiently.

Initial Number of Worker Managers

In some embodiments, instead of assigning users a static number of worker managers based on their concurrent limit, the scaling manager 150 determines a maximum number of worker managers to be assigned to a given user, and scales the number of worker managers assigned to the given user at any given time as needed (e.g., based on the code execution requests sent by the given user).

For example, instead of always having the maximum number of worker managers assigned to the user, the user may be initially assigned a minimum number (e.g., 1) of worker managers that is less than the maximum number. Upon determining that the number of worker managers currently assigned to the user is insufficient to handle the user's workload, the scaling manager 150 may increase the number of worker managers assigned to the user accordingly.

Alternatively, instead of always having the maximum number of worker managers assigned to the user, the user may be initially assigned the maximum number (e.g., equal to the user's concurrency limit divided by the per-user concurrency limit of worker managers) of worker managers that is greater than a minimum number of worker managers. Upon determining that the worker managers currently assigned to the user are not being sufficiently utilized, the scaling manager 150 may decrease the number of worker managers assigned to the user accordingly.

In yet other cases, instead of always having the maximum number of worker managers assigned to the user, the user may be initially assigned an initial number of worker managers that is greater than a minimum number of worker managers but less than the maximum number of worker managers (e.g., equal to the user's concurrency limit divided by the per-user concurrency limit of worker managers). Upon determining that the number of worker managers currently assigned to the user is insufficient to handle the user's workload, the scaling manager 150 may increase the number of worker managers assigned to the user accordingly, and upon determining that the worker managers currently assigned to the user are not being sufficiently utilized, the scaling manager 150 may decrease the number of worker managers assigned to the user accordingly.

Communication Between Worker Managers and Frontends

In some implementations, when a frontend forwards a code execution request to a worker manager, the worker manager may respond in one of two ways: (i) the worker manager may perform the requested code execution, or (ii) the worker manager may send a signal back to the frontend indicating that the worker manager is overloaded and cannot handle any additional requests. In response to receiving such a signal from the worker manager, the frontend may forward the code execution request to the next worker manager in the set of worker managers assigned to the user. Upon receiving the same signal consecutively from a threshold number of worker managers, the frontend because the set of worker managers assigned to the user to be scaled up (e.g., by adding one or more additional worker managers to the set). For example, the scaling manager 150 may initially assign two worker managers to the user. If the scaling manager 150 determines that each of the two worker managers are overloaded, the scaling manager 150 may assign one or more additional worker managers to the user. In another example, upon determining that a threshold number (e.g., 3, 4, 5, or another number that is less than the total number of worker managers assigned to the user) of the worker managers assigned to the user are overloaded, the scaling manager 150 may assign one or more additional worker managers to the user. Alternatively, upon determining that all of the worker managers assigned to the user are overloaded, the scaling manager 150 may assign one or more additional worker managers to the user.

Upon determining that a load (e.g., average load, total load, etc.) on the worker managers assigned to the user is a threshold level, the scaling manager 150 may dissociate one or more worker managers currently assigned to the user from the user. For example, the scaling manager 150 may initially assign two worker managers to the user. If the scaling manager 150 determines that the code execution requests sent by the user are not resulting in any concurrent code executions (e.g., because the user is sending subsequent code execution requests after prior code executions have been completed) or resulting in a number of concurrent code executions that can be handled by a fewer number of worker managers, the scaling manager 150 may dissociate one or more worker managers from the user.

Default Concurrency Limit

When the frontend receives a code execution request from a user previously unseen by the frontend, the frontend may assume that the user has a default concurrency limit. In some embodiments, the default concurrency limit is equal to the per-user concurrency limit of a worker manager (or a multiple of such a per-user concurrency limit). For example, if each worker manager can handle up to 50 concurrent code execution requests from a user, the default concurrency limit may be 50 (or 100, 150, etc.).

Frontend Local State

In some embodiments, each frontend maintains, in a local memory, data indicating the individual users' concurrency limits and the number of worker managers currently assigned. The data maintained by one frontend may differ from those maintained by other frontends. In some embodiments, such data may be stored on one or more servers logically or physically separate from the frontends.

Worker Manager Local State

In some embodiments, each worker manager maintains, in a local memory, data indicating the individual users' concurrency limits and the number of worker managers currently assigned. In some of such embodiments, such data is stored in response to a request from a frontend. The data maintained by one worker manager may differ from those maintained by other worker managers. In some embodiments, such data may be stored on one or more servers logically or physically separate from the worker managers.

Communication Among Frontends

In some embodiments, the frontends 130 do not communicate with each other. In other embodiments, the frontends 130 communicate with each other but do not share data related to scaling of the worker managers assigned to the individual users of the on-demand code execution environment 110. For example, in some cases, a first frontend may determine that a first number of worker managers are assigned to a given user, whereas a second frontend may determine that a second number of worker managers are assigned to the given user at the same moment, where the second number is greater than the first number. In such an example, the second frontend may iterate through a greater number of worker managers than the first frontend.

Eventual Consistency Across Multiple Frontends

In some implementations, worker manager scaling information (e.g., the number of worker managers currently assigned to a given user) is not shared across multiple frontends, thereby resulting in a simpler design of the on-demand code execution environment.

In other implementations, worker manager scaling information is shared across the multiple frontends (e.g., using a gossip protocol), thereby resulting in code execution requests that are more evenly distributed across the worker managers. For example, upon receiving an indication that a worker manager assigned to a given user is overloaded or otherwise unavailable to handle a code execution request, the frontend propagates the received indication to other frontends on the on-demand code execution environment 110. The frontend may request additional information from the other frontends and determine whether to scale the worker managers assigned to the given user based on the additional information received from the other frontends.

In some embodiments, if one or more of the other frontends are also near the maximum capacity with respect to the given user (e.g., above or at a threshold load level), such frontends on the on-demand code execution environment 110 may scale up (e.g., all of the frontends or only the overloaded frontends scale up the user's arc according to one or more scaling methods described herein). If one or more of the other frontends indicate that the user's arc is underutilized (e.g., below a threshold load level), such frontends may scale down the user's arc, whereas the frontend receiving the throttling or error response may scale up. In some embodiments, based on a determination that the other frontends need not be scaled up or scaled down, only the frontend receiving the throttling or error response may scale up.

Multiple Frontends

In some embodiments, a given code execution request is not tied to a particular frontend. For example, when the on-demand code execution environment 110 receives a code execution request, the load balancer 120 may forward the received code execution request to any of the frontends 130. In some embodiments, even though any of the frontends 130 may receive the incoming code execution request of a user, regardless of which frontend 130 receives the incoming code execution request, the code execution request is sent to a designated worker manager in the set of worker managers assigned to the user.

In some embodiments, a frontend has its own number of worker managers assigned to a given user and its own iteration order for iterating through the worker managers. In some of such embodiments, the iteration order of one frontend for a given user is different from the iteration order of another frontend for the given user (e.g., to better distribute the incoming code executions across the given user's arc). A frontend may keep track of the worker manager to which the most recent code execution request was sent. In such a case, the frontend may sent the immediately subsequent request to a worker manager that immediately follows the most recently used worker manager in the iteration order.

Iterating Through Assigned Worker Managers

When two or more worker managers are assigned to a user, the frontend may distribute the code execution requests from the user across the worker managers in a specific order. For example, if worker managers A, B, and C are assigned to a given user, the frontend may send the first request associated with the given user and received by the frontend to worker manager A, send the second request associated with the given user and received by the frontend to worker manager B, send the third request associated with the given user and received by the frontend to worker manager C, send the fourth request associated with the given user and received by the frontend to worker manager A, and so on.

Caching of List of Worker Managers

A frontend may cache the list of worker managers assigned to a given user so that the frontend would not have to calculate the hash value corresponding to the user each time a code execution request is received. The hash value may be calculated based on the user ID of the user (e.g., by applying a hash function on the user ID). Upon receiving a code execution request, the frontend may first determine whether the cache accessible by the frontend includes the list of worker managers assigned to the user associated with the code execution request. In some embodiments, the frontend may keep track of the order of the worker managers assigned to a given user. The frontend may also keep track of the identity of the worker manager that was most recently accessed. For example, upon receiving a code execution request, the frontend may determine the identity of the worker manager that follows the most recently accessed worker manager in the order in which the set of worker managers is to be iterated. If the frontend determines that the list of worker managers assigned to the user associated with the code execution request comprises worker managers A, B, C, and D in that specific order, and the most recently accessed worker manager was worker manager B, the frontend may reach out to worker manager C (the worker manager immediately subsequent to worker manager B) to acquire the compute capacity for executing the program code for the code execution request.

Rate of Worker Manager Scaling

In some embodiments, the scaling manager 150 may limit how quickly a set of worker managers assigned to a user may be scaled up. For example, the scaling manager 150 may allow a set of worker managers to be scaled up only a threshold number of times during a specific temporal window (e.g., only one scale-up every hour). In another example, the scaling manager 150 may allow a set of worker managers to be scaled up only a threshold number of times over a threshold amount of code execution requests associated with the user (e.g., only one scale-up every 10 code execution requests).

In yet another example, the scaling manager 150 may allow only a threshold number of worker managers to be added to the set of worker managers assigned to the user during a specific temporal window (e.g., only 4 worker managers every hour). In yet another example, the scaling manager 150 may allow only a threshold number of worker managers to the set of worker managers assigned to the user over a threshold amount of code execution requests associated with the user (e.g., only 4 worker managers every 10 code execution requests).

The scale-up may include adding a specific number of worker managers to the set of worker managers assigned to the user. For example, each scale-up may add a fixed number of worker managers (e.g., 1, 2, 4, etc.). As another example, each scale-up may add an increasing or decreasing number of worker managers (e.g., the first scale-up may add one worker manager to be added to the set, the second scale-up may add two, etc.). Alternatively or additionally, the scale-up may be based on the number of worker managers currently assigned to the user (e.g., scale-up may include doubling the size of the set or increasing the number of worker managers assigned to the user by 50%). In some other cases, the scale-up may be adding a number of worker managers to the set based on the concurrency limit associated with the user (e.g., scale-up may include adding 10% of the number of worker managers capable of handling the concurrency limit).

In some embodiments, the limit on how quickly a set of worker managers assigned to a user may be scaled up is activated only when the available capacity in the warming pool 135A is below a threshold level. For example, upon determining that the available capacity in the warming pool 135A has fallen below the threshold level, the scaling manager 150 starts limiting how quickly a set of worker managers assigned to a user may be scaled up, according to the techniques described herein.

In some implementations, the scaling manager 150 scales the worker managers at a first rate during a first time period and at a second rate during a second time period. For example, the scaling manager 150 may add 20% of the maximum number of worker managers that can be assigned to the user on the first scale-up, and add 10% of the maximum number of worker managers that can be assigned to the user on the subsequent scale-ups. In another example, the scaling manager 150 may increase the size of the set of worker managers assigned to the user tenfold on the first scale-up, and increase the size of the set of worker managers assigned to the user twofold on the subsequent scale-ups.

In some embodiments, the scaling manager 150 scales the set of worker managers assigned to the user based on the traffic pattern of the code execution requests associated with the user. If the scaling manager 150 determines that a given user has a spiky traffic pattern, each time a scale-up is needed for the user, the scaling manager 150 may add a greater number of worker managers to the user's set than usual (e.g., compared to a user with a non-spiky traffic pattern). The scaling manager 150 may scale the set of worker managers up or down based on a scaling policy specified by the user or determined for the user.

Arc and Arc Size

The set of worker managers assigned to a given user may be referred to herein as the giving user's "arc" since in some embodiments, the worker managers are distributed around a hash ring (as illustrated in FIG. 2), and a set of consecutive worker managers on the hash ring forms an arc of the hash ring. In such embodiments, the user's arc size refers to the number of worker managers in the set of worker managers assigned to the user.

New User

When a frontend receives a code execution request from a previously unseen user, the friend may assume that the arc size of the user has a default initial value (e.g., zero, or a minimum number of worker managers assigned to individual users on the on-demand code execution environment 110). The frontend may determine that the code execution request is from a previously unseen user if the frontend cannot find an arc size value corresponding to the user in its local memory.

Scale-Down for Inactive Users

Upon determining that the user has been inactive for a threshold amount of time, the scaling manager 150 may scale down the set of worker managers assigned to the user. The scaling manager 150 may determine that the user has been inactive for a threshold amount of time if the on-demand code execution environment 110 does not receive any code execution requests associated with the user during the threshold amount of time.

The scaling manager 150 may scale down a set of worker managers assigned to the user by dissociating one or more worker managers in the set from the user. For example, if worker managers A, B, and C are assigned to the user, after the scale-down, only worker managers A and B may be assigned to the user, and the code execution requests associated with the user may be sent to the worker managers A and B in an alternating manner. If only a single worker manager is assigned to the user when a scale-down is to be performed for the user, the arc size of the user may be set to zero in the local memory associated with the particular frontend initiating the scale-down. If the user is inactive for a threshold amount of time, each of the frontends may scale down the worker managers assigned to the user, eventually setting the arc size of the user to zero. The process of scaling down a set of worker managers assigned to a user is further described in greater detail with reference to FIG. 5.

Initializing a New Frontend

When a new frontend is added to the on-demand code execution environment 110, upon receiving a code execution request associated with the user, the new frontend may request scaling information from a worker manager assigned to the user so that the new frontend can properly route requests associated with the user. For example, the new frontend may call an API for retrieving the arc size of the user from the worker manager assigned to the user. The identity of the worker manager assigned to the user may be determined using a hash function described herein.

Preserving Scaling Information

In some embodiments, every time a frontend processes a code execution request associated with the user, the frontend sends the scaling information (e.g., the current arc size of the user) to the worker manager assigned to the user. In some cases, the frontend sends the scaling information to each of the worker managers assigned to the user. Alternatively, the frontend may send the scaling information to only the specific worker manager handling the given code execution request. The scaling information stored with the worker manager may later be retrieved by a different frontend that is new to the on-demand code execution environment 110.

Behavior of New Frontends

Upon receiving a code execution request associated with a previously unseen user, a frontend may first determine whether more than a threshold period of time has passed since the frontend was added to the on-demand code execution environment 110 (or since startup). In some embodiments, if the frontend determines that more than a threshold period of time has passed since the frontend was added to the on-demand code execution environment 110 (or since startup), the frontend determines that the arc size of the user has been scaled down to zero. If the frontend determines that more than a threshold period of time has not passed since the frontend was added to the on-demand code execution environment 110 (or since startup), the frontend requests the arc size of the user from a worker manager assigned to the user (or a worker manager identified based on the hash function and the information associated with the user).

For example, upon receiving a code execution request associated with a previously unseen user, a frontend may first determine if it has been more than 15 minutes since its startup. If the frontend determines that it has been more than 15 minutes since its startup, the frontend may determine that the arc size of the user is zero, update your size of the user to a nonzero value (e.g., 1 or another minimum value), and cause the request to be handled by a worker manager assigned to the user. If the frontend determines that it has not been more than 15 minutes since its startup, the frontend may request the arc size of the user from a worker manager assigned to the user.

Timing of Scaling

The scaling manager 150 may scale up a user's arc size (e.g., the number of worker managers assigned to the user) after a threshold number of worker managers assigned to the user returns a throttling response (e.g., indicating that the worker manager is overloaded or has reached its capacity reserved for the user) in response to a request to reserve a virtual machine instance or a container for executing the user's program code. In some embodiments, the scaling manager 150 scales up a user's arc size after a single throttling or error response from a worker manager on the user's arc. In some of such embodiments, after the scale-up, the scaling manager 150 requests compute capacity from a worker manager newly added to the user's arc for executing the program code. If the newly added worker manager returns a throttling or error response, the on-demand code execution environment 110 returns an error response back to the user (or another entity requesting the execution of the program code). In other embodiments, the scaling manager 150 may try a first threshold number of worker managers and scale up a second threshold number of times before such an error response is returned back to the user.

As for scaling down, the worker manager may report back to the frontend what percentage of its capacity is being used for the particular user. Upon determining that the percentage has fallen below a threshold level, the scaling manager 150 may scale down the user's arc size (e.g., the number of worker managers assigned to the user). In some embodiments, upon determining that the percentage has been below a threshold level for a threshold amount of time, the scaling manager 150 may scale down the user's arc size (e.g., the number of worker managers assigned to the user).

In some embodiments, the scaling manager 150 may periodically check, for each user, whether the average load across all of the worker managers assigned to the user is below a threshold. For example, the scaling manager 150 may check every 5 minutes whether the average load across the worker managers assigned to the user is below 50%. Upon determining that the average load is below 50%, the scaling manager 150 may scale down the user's arc. The periodic checking may be performed for each frontend.

Preemptive Scaling

In some embodiments, the scaling manager 150 scales up a set of worker managers assigned to a user before the user's concurrency limit is reached. For example, if the scheduling manager 150 determines that the average load value associated with the user is above a threshold load level (or a threshold number of concurrent executions for the user, a group of users, or all users), the scaling manager 150 scales up the set of worker managers assigned to the user (e.g., before a throttling response is received from one of the worker managers and the set).

In some embodiments, the scaling manager 150 performs an adaptive scaling based on the load profile associated with a given user. For example, the scaling manager 150 may scale the set of order managers assigned to the given user in advance of regularly scheduled events or spikes. In some embodiments, in response to determining that the load profile associated with the user is spiky (e.g., isolated peaks in incoming code execution requests), the scaling manager 150 scales the set of worker managers more restrictively (e.g., fewer number of scale-ups, smaller scale-ups, etc.), and in response to determining that the load profile associated with the user is smooth (e.g., not spiky), the scheduling manager 150 scales to set of worker managers more liberally (e.g., more frequent scale-ups, larger scale-ups, etc.).

Intermediate Layer Between Frontends and Worker Managers

In some embodiments, although not illustrated in FIG. 1, one or more intermediate entities that are logically or physically separate from the frontends and/or the worker managers may relay information between the frontends and the worker managers. For example, a worker manager may communicate its capacity information (e.g., number of concurrent executions, load percentage, etc.) to such an intermediate entity, and the intermediate entity may process and/or forward such information to the appropriate frontend(s). In some embodiments, some of such information may be directly exchanged between the frontends and the worker managers.

Reaching Concurrency Limit

If the scaling manager 150 determines that a user's arc size has been scaled to the limit (e.g., the number of worker managers assigned to the user is at the maximum level allowed by the concurrency limit) and a threshold number of consecutive throttling responses have been received from the worker managers in the user's arc, the scaling manager 150 may send a notification to the user (e.g., via the user computing device 102), indicating that the user has reached his or her maximum capacity. The scaling manager 150 may further cause a selectable option of increasing the limit to be presented to the user.

Overlapping of User's Arcs

The worker manager ring illustrated in FIG. 2 may be shared by multiple users of the on-demand code execution environment 110. In some embodiments, some or all of the arcs of such users are overlapped on the worker manager ring. For example, one or more worker managers on the worker manager ring may concurrently handle requests associated with multiple users. In some embodiments, there is a maximum number of concurrent code executions that a given worker manager is allowed to handle regardless of the user associated with the code executions. For example, such a maximum number may be a multiple of the per-user concurrency limit. Alternatively, the on-demand code execution environment may not artificially restrict the total number of concurrent code executions handled by a single worker manager.

Worker Manager Brownout Protection

The scaling manager 150 may track the throttling state of the individual worker managers. For example, upon receiving a response from a worker manager that is not a successful response (e.g., a throttling response or an error response), a frontend may not send another code execution request to the same worker manager for a first threshold amount of time (e.g., 500 ms). In some embodiments, if the same worker manager again returns a response other than a successful response after the threshold amount of time has passed, the frontend may not send another code execution request to the same worker manager for a second threshold amount of time that is greater than the first threshold amount of time. For example, the second threshold amount of time may be twice as long as the first threshold amount of time. The frontend may continue in a similar manner such that the threshold amount of time during which the frontend does not send a code execution request to the worker manager grows exponentially for each consecutive non-successful response from the worker manager. In some embodiments, the back-off period (e.g., the threshold amount of time for which the frontend does not send another request to the worker manager) may be based on a function duration (e.g., average time for which the execution of the program code lasts, a maximum duration allowed for the execution of the program code, etc.).

General Architecture of Scaling Manager

Figure 3:
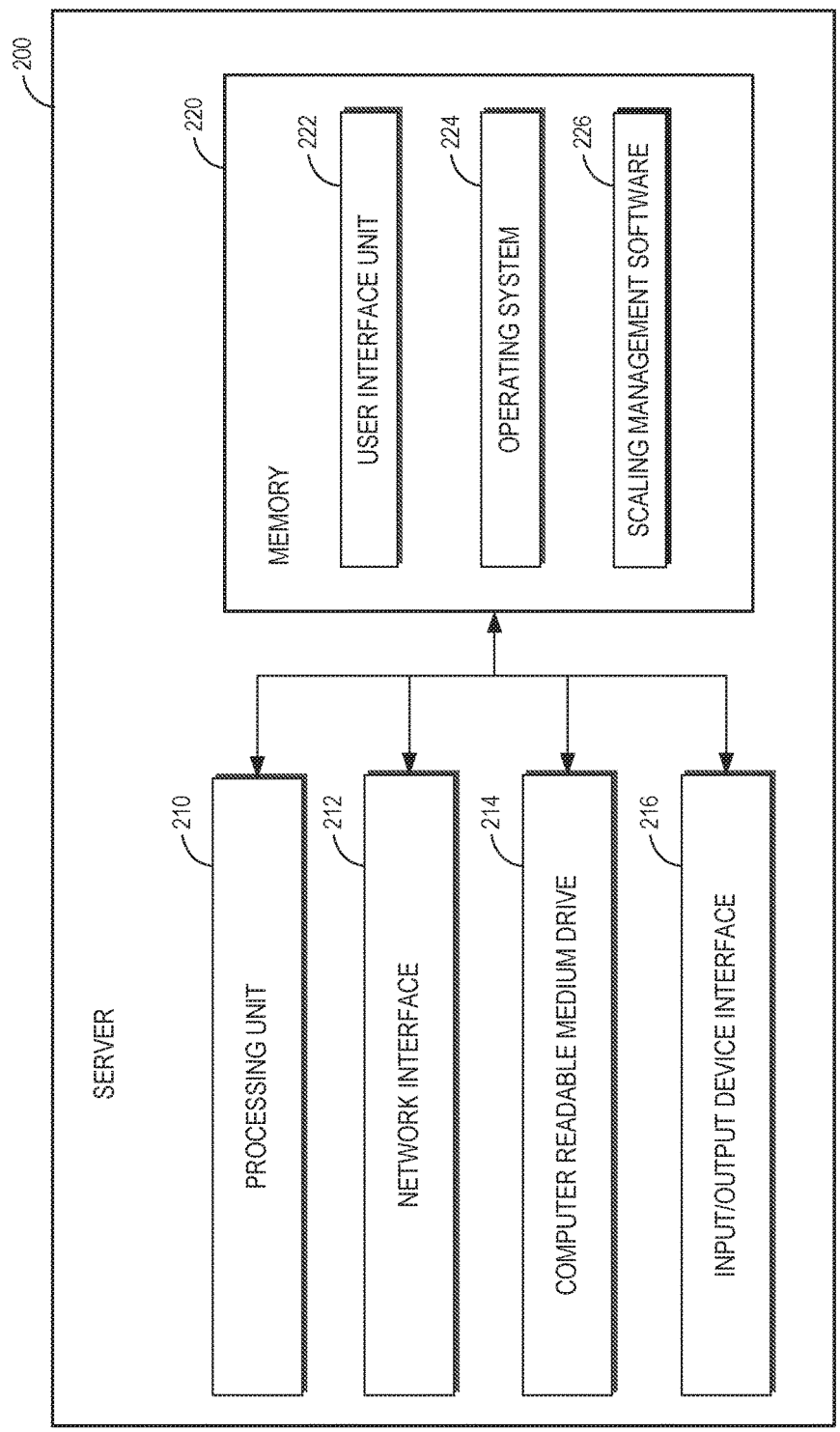
FIG. 3 depicts a general architecture of a computing device providing the scaling manager of FIG. 1.

FIG. 3 depicts a general architecture of a computing system (referenced as server 200) that implements embodiments of the present disclosure to enable concurrency and scaling management on the on-demand code execution environment 110. The general architecture of the server 200 depicted in FIG. 3 includes an arrangement of computer hardware and software modules that may be used to implement aspects of the present disclosure. The hardware modules may be implemented with physical electronic devices, as discussed in greater detail below. The server 200 may include many more (or fewer) elements than those shown in FIG. 3. It is not necessary, however, that all of these generally conventional elements be shown in order to provide an enabling disclosure. Additionally, the general architecture illustrated in FIG. 3 may be used to implement one or more of the other components illustrated in FIG. 1. As illustrated, the server 200 includes a processing unit 210, a network interface 212, a computer readable medium drive 214, and an input/output device interface 216, all of which may communicate with one another by way of a communication bus. The network interface 212 may provide connectivity to one or more networks or computing systems. The processing unit 210 may thus receive information and instructions from other computing systems or services via the network 104. The processing unit 210 may also communicate to and from memory 220 and further provide output information for an optional display (not shown) via the input/output device interface 216. The input/output device interface 216 may also accept input from an optional input device (not shown).

The memory 220 may contain computer program instructions (grouped as modules in some embodiments) that the processing unit 210 executes in order to implement one or more aspects of the present disclosure. The memory 220 generally includes RAM, ROM and/or other persistent, auxiliary or non-transitory computer readable media. The memory 220 may store an operating system 224 that provides computer program instructions for use by the processing unit 210 in the general administration and operation of the server 200. The memory 220 may further include computer program instructions and other information for implementing aspects of the present disclosure. For example, in one embodiment, the memory 220 includes a user interface unit 222 that generates user interfaces (and/or instructions therefor) for display upon a computing device, e.g., via a navigation and/or browsing interface such as a browser or application installed on the computing device. In addition, the memory 220 may include and/or communicate with one or more data repositories, which may correspond to any persistent or substantially persistent data storage, such as a hard drive (HDD), a solid state drive (SDD), network attached storage (NAS), a tape drive, or any combination thereof.

In addition to and/or in combination with the user interface unit 222, the memory 220 may include scaling management software 226 that corresponds to computer-executable instructions which, when executed by the server 200, implement the functions described above with respect to the scaling manager 150. While the scaling management software 226 is shown in FIG. 3 as part of the server 200, in other embodiments, all or a portion of the account manager 160 may be implemented by other components of the on-demand code execution environment 110 and/or another computing device. For example, in certain embodiments of the present disclosure, another computing device in communication with the on-demand code execution environment 110 may include several modules or components that operate similarly to the modules and components illustrated as part of the account manager 160.

While the computing device of FIG. 3 is described as implementing the scaling manager 150, the same or a similar computing device may additionally or alternatively be utilized to implement other components of the on-demand code execution environment 110. For example, such a computing device may be utilized, independently or in conjunction with other components (e.g., data stores) to implement the warming pool manager or the worker managers of FIG. 1. The software or computer-executable instructions placed within the memory 220 may be modified to enable execution of the functions described herein with respect to the warming pool manager or the worker managers.

Example Routine for Scaling Worker Managers of a User

Figure 4:
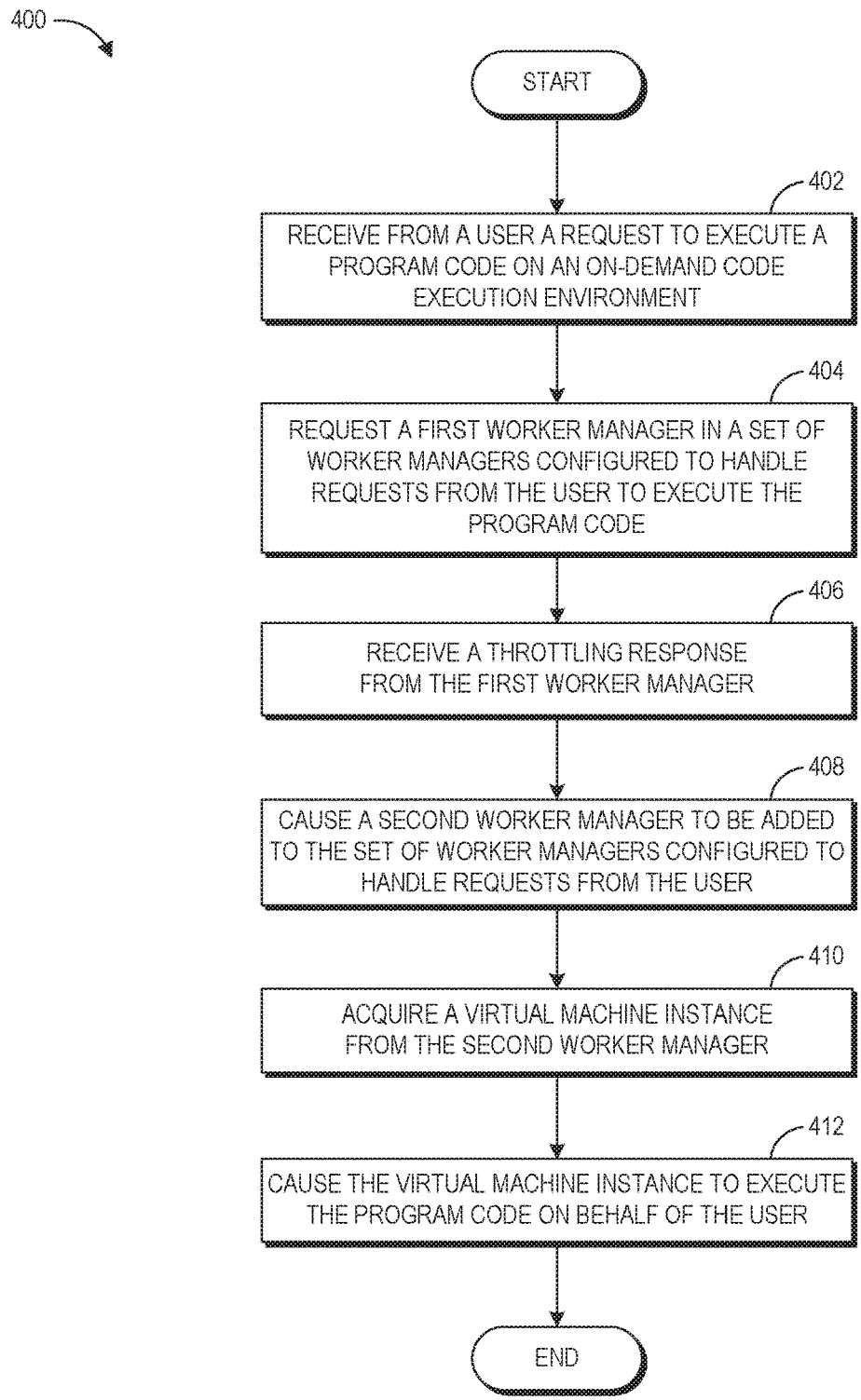
FIG. 4 is a flow chart depicting an illustrative routine for scaling the worker managers assigned to a given user.

Turning now to FIG. 4, an example routine 400 implemented by one or more components of the on-demand code execution environment 110 (e.g., the frontend 130) will be described. Although the routine 400 is described with regard to implementation by the frontend 130, one skilled in the relevant art will appreciate that alternative components (e.g., the scaling manager 150, the worker managers, etc.) may implement the routine 400 or that one or more of the blocks of the routine 400 may be implemented by a different component or in a distributed manner.

At block 402 of the illustrative routine 400, the frontend 130 receives a request to execute a program code on the on-demand code execution environment 110. For example, the request may include one or more parameters related to the program code to be executed, such as the user ID, the program code ID, etc.

At block 404, the frontend 130 requests a first worker manager (also referred to herein as virtual machine instance manager) to execute the program code on behalf of the user. For example, the first worker manager may be in a set of worker managers configured to process code executions requests associated with the user (e.g., assigned to the user).

At block 406, the frontend 130 receives a response from the first virtual machine instance manager indicating that the first virtual machine instance manager did not successfully execute the program code on behalf of the user. For example, the response may be a throttling response indicating that the first virtual machine instance manager is currently overloaded with other code executions being performed on behalf of the user.

At block 408, the frontend 130 causes a second worker manager different from the first worker manager to be added to the set of worker managers configured to process code executions requests associated with the user. Prior to causing the second worker manager to be added to the set, the frontend 130 may request one or more remaining worker managers in the set to execute the program code on behalf of the user.

At block 410, the frontend 130 acquires a virtual machine instance from the second worker manager for executing the program code on behalf of the user. For example, the frontend 130 may send a virtual machine instance reserve request (or a container reserve request) to the second worker manager, and in response to receiving such a request, the second worker manager may identify a virtual machine instance and return the identity (e.g., IP address, location, or other information that can be used by the frontend 130 to communicate with the identified virtual machine instance) of the virtual machine instance to the frontend 130.

At block 412, the frontend 130 causes the virtual machine instance to execute the program code on behalf of the user. For example, the frontend 130 may cause a copy of the program code to be downloaded onto a container created on the virtual machine instance, and cause the downloaded copy of the program code to be executed in the container. The results and/or return values of the executed program code may be sent to the user who requested the execution of the program code.

While the routine 400 of FIG. 4 has been described above with reference to blocks 402-412, the embodiments described herein are not limited as such, and one or more blocks may be omitted, switched, or modified without departing from the spirit of the present disclosure. For example, in some embodiments, the frontend 130 causes a virtual machine instance identified by the first worker manager to execute the program code on behalf of the user, and blocks 406-412 may be omitted.

Example Routine for Scaling Worker Managers of a User

Figure 5:
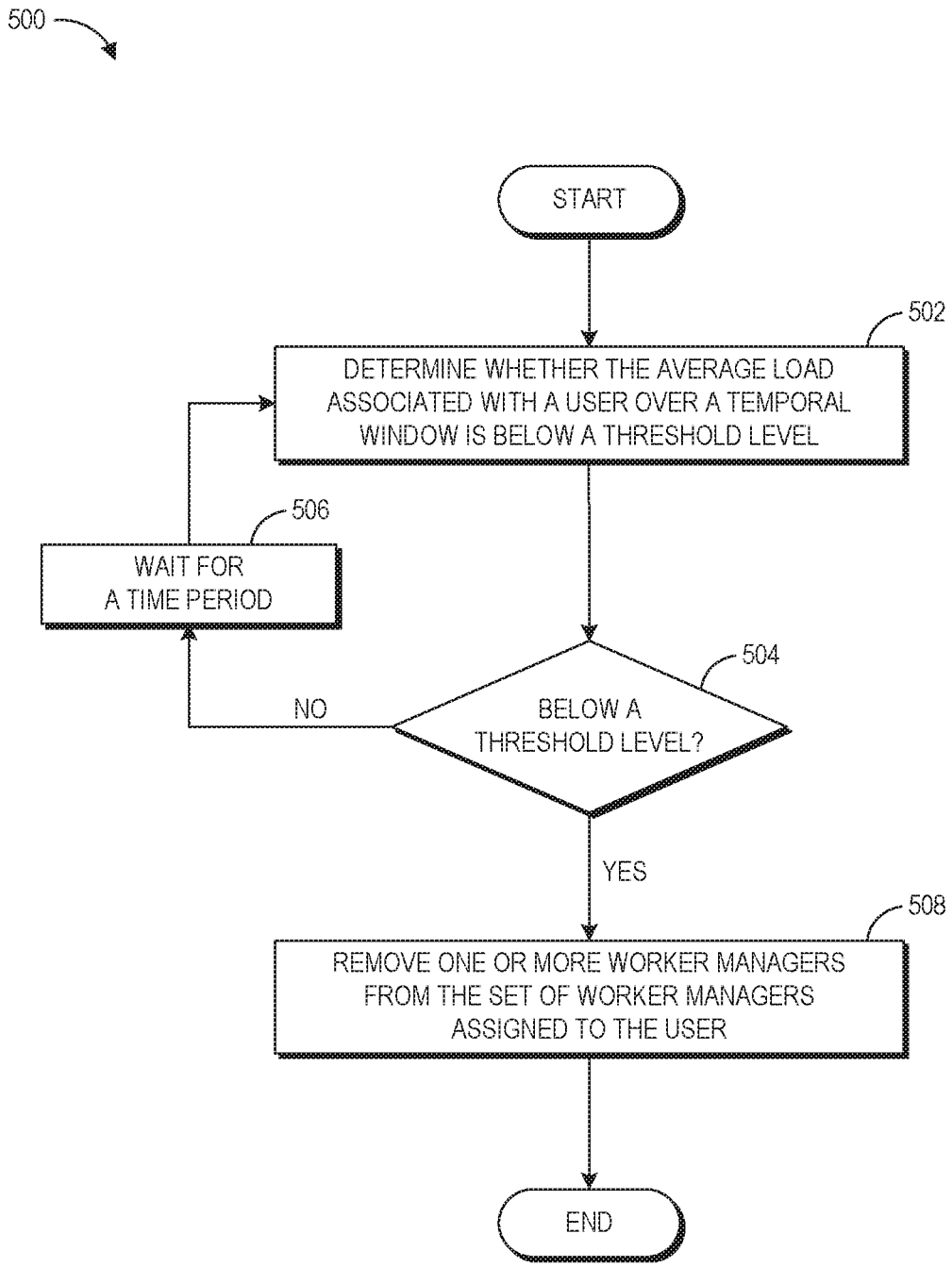
FIG. 5 is a flow chart depicting another illustrative routine for scaling the worker managers assigned to a given user.

Turning now to FIG. 5, an example routine 500 implemented by one or more components of the on-demand code execution environment 110 (e.g., the frontend 130) will be described. Although the routine 500 is described with regard to implementation by the frontend 130, one skilled in the relevant art will appreciate that alternative components (e.g., the scaling manager 150, the worker managers, etc.) may implement the routine 500 or that one or more of the blocks of the routine 500 may be implemented by a different component or in a distributed manner.

At block 502 of the illustrative routine 500, the frontend 130 determines whether the average load associated with the user over a temporal window is below a threshold level. In some embodiments, the frontend 130 may calculate an average value of the most recently recorded load percentage (or moving average over a temporal window) of each worker manager in the set of worker managers assigned to the user. The average value may be compared to a threshold value (e.g., 30%, 50%, etc.). In other embodiments, the frontend 130 may calculate an average load value for each worker manager in the set of worker managers assigned to the user over a specific temporal window (e.g., last 5 minutes, last 30 minutes, last hour, last 24 hours, last week, last month, etc.). Then, the frontend 130 may average the average load values of the worker managers in the set, and compare the average to a threshold value.

At block 504, if the calculated value is below the threshold level, the routine 500 proceeds to block 506. Otherwise, the routine 500 proceeds to block 508.

At block 506, the frontend 130 waits for a time period and proceeds to block 502. For example, the frontend 130 periodically make the determination at block 502 to scale down the set of worker managers assigned to a given user.

At block 508, the frontend 130 removes one or more worker managers from the set of worker managers assigned to the user. In some embodiments, the frontend 130 reduces the number of worker managers assigned to the user by a number (e.g., 1, 2, etc.) or by a percentage (e.g., by 20%, by half, etc.). For example, if four worker managers are assigned to the user prior to the scale-down, during the scale-down at block 508, the frontend 130 may adjust the number to two. Alternatively or additionally, the frontend 130 may remove one or more worker managers from a list of worker managers assigned to the user. For example, if the frontend 130 determines that worker managers A-D are in the list of worker managers assigned to the user stored in the local (or remotely available) memory of the frontend 130, the frontend 130 may remove worker managers C and D from the list stored in the local (or remotely available) memory.

While the routine 500 of FIG. 5 has been described above with reference to blocks 502-508, the embodiments described herein are not limited as such, and one or more blocks may be omitted, switched, or modified without departing from the spirit of the present disclosure.

Example Routine for Scaling Worker Managers of a User

Figure 6:
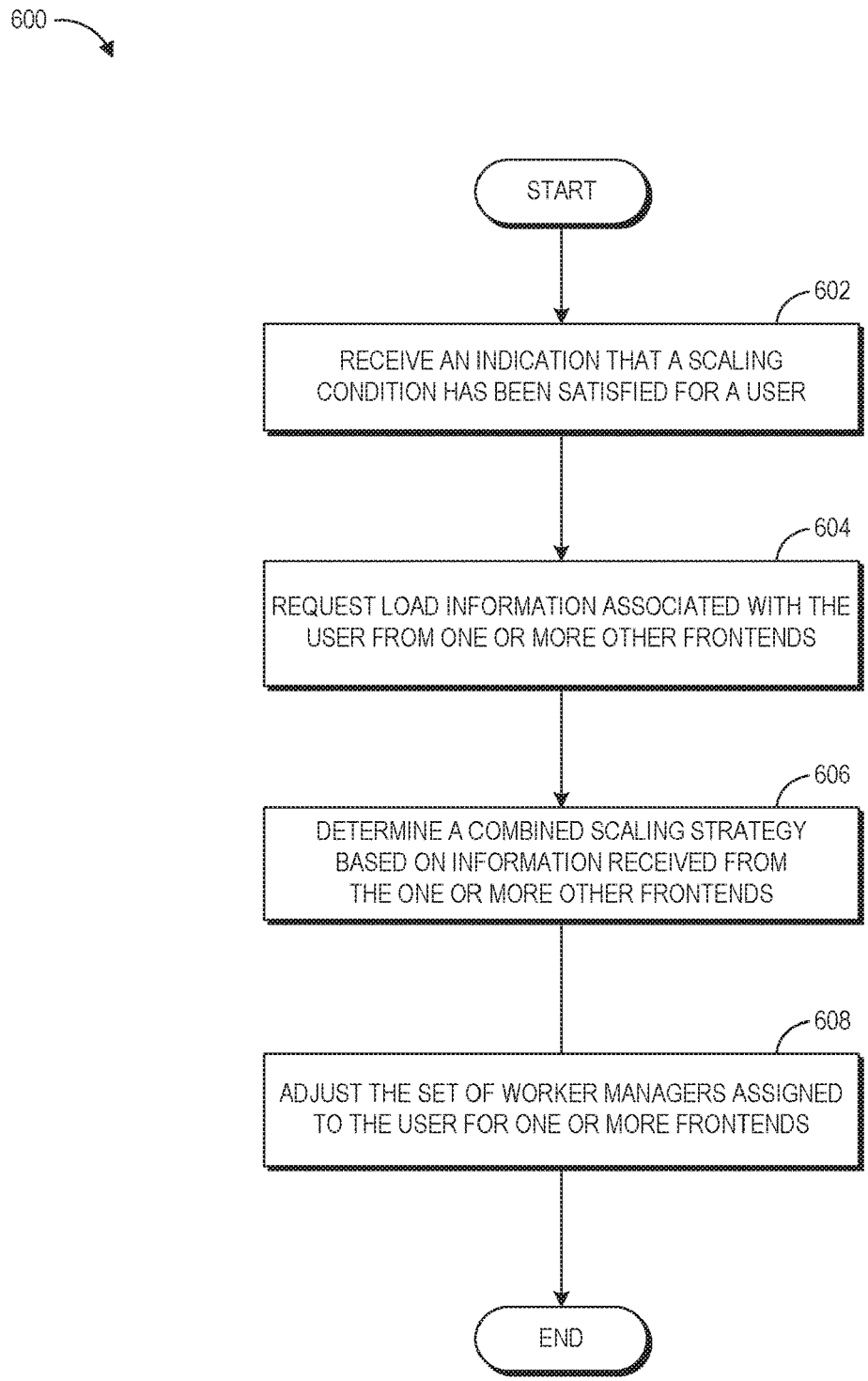
FIG. 6 is a flow chart depicting another illustrative routine for scaling the worker managers assigned to a given user.

Turning now to FIG. 6, an example routine 600 implemented by one or more components of the on-demand code execution environment 110 (e.g., the frontend 130) will be described. Although the routine 600 is described with regard to implementation by the frontend 130, one skilled in the relevant art will appreciate that alternative components (e.g., the scaling manager 150, the worker managers, etc.) may implement the routine 600 or that one or more of the blocks of the routine 600 may be implemented by a different component or in a distributed manner.

At block 602 of the illustrative routine 600, the frontend 130 receives an indication that a scaling condition has been satisfied for a given user. In some embodiments, the indication is a throttling response or an error response received from a worker manager.

At block 604, the frontend 130 requests load information associated with the given user from one or more of their frontends on the on-demand code execution environment 110. For example, the frontend 130 may query each one of the other frontends for an average load value associated with the given user. In some embodiments, the load information may include the number of worker managers assigned to the given user by each frontend. For example, upon receiving the indication that a scaling condition has been satisfied, frontend A may reach out to other frontends on the on-demand code execution environment 110 (e.g., frontends B, C, and D) and request additional information maintained by the respective frontends. In response, frontend B may send the average load association with the user and the user's arc size (in the view of frontend B) to frontend A, frontend C may send the average load association with the user and the user's arc size (in the view of frontend C) to frontend A, and frontend D may send the average load association with the user and the user's arc size (in the view of frontend D) to frontend A.

At block 606, the frontend 130 determines a combined scaling strategy based on the information received from the one or more other frontends. For example, the frontend 130 may determine that the average load values on the other frontends are not greater than a threshold level, and thus only the frontend 130 should scale its worker managers assigned to the given user. In another example, the frontend 130 may determine that the average load values of one or more of the other frontends exceed a threshold level, and thus scaling of the worker managers should be performed for the frontend 130 as well as the one or more frontends having average load values exceeding the threshold level. In yet another example, the frontend may determine that's the average load values of the other frontends are below a threshold level, and thus the frontend 130 should be scaled up while the one or more other frontends having average load values below the threshold level should be scaled down.

At block 608, the frontend 130 causes the set of worker managers assigned to the user for one or more frontends (e.g., including frontend 130) to be adjusted based on the determination at block 606.

While the routine 600 of FIG. 6 has been described above with reference to blocks 602-608, the embodiments described herein are not limited as such, and one or more blocks may be omitted, switched, or modified without departing from the spirit of the present disclosure. For example, in some embodiments, the routine 600 may be performed by a central scaling service in communication with individual frontends. In such embodiments, the central scaling service may receive an indication that a scaling condition has been satisfied for a user from a frontend at block 602, and cause the frontend to adjust the set of worker managers at block 608. For example, the central scaling service may determine and update the user's arc size for each of the frontends based on how underutilized or over-utilized the respective set of worker managers is for each frontend. In some embodiments, a scaling service that manages a group of frontends may scale the worker managers for the frontends such that the number of worker managers is decreased for a first frontend having the highest number of worker managers assigned to the user in the group and (ii) the number of worker managers is increased for a second frontend having the lowest number of worker managers assigned to the user in the group. The scaling service may periodically query the frontends and re-adjust the user's arc sizes across all the frontends so that the user's code executions are more evenly distributed. For example, the scaling service may re-adjust the user's arc sizes to be the same (or within the same range) across all the frontends.

Additional Details of Virtual Environment

Various components of the virtual environment 100 are described in greater detail below.

User Computing Device

By way of illustration, various example user computing devices 102 are shown in communication with the on-demand code execution environment 110, including a desktop computer, laptop, and a mobile phone. In general, the user computing devices 102 can be any computing device such as a desktop, laptop, mobile phone (or smartphone), tablet, kiosk, wireless device, and other electronic devices. In addition, the user computing devices 102 may include web services running on the same or different data centers, where, for example, different web services may programmatically communicate with each other to perform one or more techniques described herein. Further, the user computing devices 102 may include Internet of Things (IoT) devices such as Internet appliances and connected devices. The on-demand code execution environment 110 may provide the user computing devices 102 with one or more user interfaces, command-line interfaces (CLI), application programming interfaces (API), and/or other programmatic interfaces for generating and uploading user codes, invoking the user codes (e.g., submitting a request to execute the user codes on the on-demand code execution environment 110), scheduling event-based jobs or timed jobs, tracking the user codes, and/or viewing other logging or monitoring information related to their requests and/or user codes. Although one or more embodiments may be described herein as using a user interface, it should be appreciated that such embodiments may, additionally or alternatively, use any CLIs, APIs, or other programmatic interfaces.

Network

The user computing devices 102 access the on-demand code execution environment 110 over a network 104. The network 104 may be any wired network, wireless network, or combination thereof. In addition, the network 104 may be a personal area network, local area network, wide area network, over-the-air broadcast network (e.g., for radio or television), cable network, satellite network, cellular telephone network, or combination thereof. For example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The on-demand code execution environment 110 is depicted in FIG. 1 as operating in a distributed computing environment including several computer systems that are interconnected using one or more computer networks. The on-demand code execution environment 110 could also operate within a computing environment having a fewer or greater number of devices than are illustrated in FIG. 1. Thus, the depiction of the on-demand code execution environment 110 in FIG. 1 should be taken as illustrative and not limiting to the present disclosure. For example, the on-demand code execution environment 110 or various constituents thereof could implement various Web services components, hosted or "cloud" computing environments, and/or peer-to-peer network configurations to implement at least a portion of the processes described herein.

Further, the on-demand code execution environment 110 may be implemented in hardware and/or software and may, for instance, include one or more physical or virtual servers implemented on physical computer hardware configured to execute computer executable instructions for performing various features that will be described herein. The one or more servers may be geographically dispersed or geographically co-located, for instance, in one or more data centers.

Definition of Virtual Machine Instance

As used herein, the term "virtual machine instance" may refer to an execution of software or other executable code that emulates hardware to provide an environment or platform on which software may execute (an "execution environment"). Virtual machine instances are generally executed by physical hardware devices, which may differ from the hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a single device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, are known within the art.

Logical Illustration of On-Demand Code Execution Environment

The illustration of the various components within the on-demand code execution environment 110 is logical in nature and one or more of the components can be implemented by a single computing device or multiple computing devices. For example, the instances 152 and 154 can be implemented on one or more physical computing devices in different various geographic regions. Similarly, each of the load balancer 120, the frontends 130, the warming pool manager 135, the worker manager ring 140, and the scaling manager 150 can be implemented across multiple physical computing devices. Alternatively, one or more of such components can be implemented on a single physical computing device. In some embodiments, the on-demand code execution environment 110 may comprise multiple frontends, multiple warming pool managers, multiple worker manager rings, and/or multiple scaling managers. Although worker managers are shown in the example of FIG. 1, the embodiments described herein are not limited as such, and one skilled in the art will appreciate that the on-demand code execution environment 110 may comprise any number of worker managers implemented using any number of physical computing devices. Similarly, although a single warming pool is shown in the example of FIG. 1, the embodiments described herein are not limited as such, and one skilled in the art will appreciate that the on-demand code execution environment 110 may comprise any number of warming pools.

Network and On-Demand Code Execution Environment

In the example of FIG. 1, the on-demand code execution environment 110 is illustrated as being connected to the network 104. In some embodiments, any of the components within the on-demand code execution environment 110 can communicate with other components of the virtual environment 100 via the network 104. In other embodiments, not all components of the on-demand code execution environment 110 are capable of communicating with other components of the virtual environment 100. In one example, only the load balancer 120 and/or the frontends 130 may be connected to the network 104, and other components of the on-demand code execution environment 110 may communicate with other components of the virtual environment 100 via the load balancer 120 and/or the frontends 130.

Use of On-Demand Code Execution Environment

As discussed above, users may use the on-demand code execution environment 110 to execute user code thereon. For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. Alternatively, the user may send a code execution request to the on-demand code execution environment 110. The on-demand code execution environment 110 can handle the acquisition and configuration of compute capacity (e.g., containers, instances, etc., which are described in greater detail below) based on the code execution request, and execute the code using the compute capacity. The on-demand code execution environment 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying).

User Code

The user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific task, for example, in connection with a particular web application or mobile application developed by the user. For example, the user codes may be written in JavaScript (node.js), Java, Python, and/or Ruby. The request may include the user code (or the location thereof) and one or more arguments to be used for executing the user code. For example, the user may provide the user code along with the request to execute the user code. In another example, the request may identify a previously uploaded program code (e.g., using the API for uploading the code) by its name or its unique ID. In yet another example, the code may be included in the request as well as uploaded in a separate location (e.g., an external storage service or a storage system internal to the on-demand code execution environment 110) prior to the request is received by the on-demand code execution environment 110. The on-demand code execution environment 110 may vary its code execution strategy based on where the code is available at the time the request is processed.

User Request

The load balancer 120 and/or the frontends 130 may receive the request to execute such user codes in response to Hypertext Transfer Protocol Secure (HTTPS) requests from a user. Also, any information (e.g., headers and parameters) included in the HTTPS request may also be processed and utilized when executing the user code. As discussed above, any other protocols, including, for example, HTTP, MQTT, and CoAP, may be used to transfer the message containing the code execution request to the load balancer 120 and/or the frontends 130. The load balancer 120 and/or the frontends 130 may also receive the request to execute such user codes when an event is detected, such as an event that the user has registered to trigger automatic request generation. For example, the user may have registered the user code with an auxiliary service 106 and specified that whenever a particular event occurs (e.g., a new file is uploaded), the request to execute the user code is sent to the load balancer 120 and/or the frontends 130. Alternatively, the user may have registered a timed job (e.g., execute the user code every 24 hours). In such an example, when the scheduled time arrives for the timed job, the request to execute the user code may be sent to the load balancer 120 and/or the frontends 130. In yet another example, the load balancer 120 and/or the frontends 130 may have a queue of incoming code execution requests, and when the user's batch job is removed from the on-demand code execution environment's work queue, the load balancer 120 and/or the frontends 130 may process the user request. In yet another example, the request may originate from another component within the on-demand code execution environment 110 or other servers or services not illustrated in FIG. 1.

A user request may specify one or more third-party libraries (including native libraries) to be used along with the user code. In one embodiment, the user request is a ZIP file containing the user code and any libraries (and/or identifications of storage locations thereof). In some embodiments, the user request includes metadata that indicates the program code to be executed, the language in which the program code is written, the user associated with the request, and/or the computing resources (e.g., memory, etc.) to be reserved for executing the program code. For example, the program code may be provided with the request, previously uploaded by the user, provided by the on-demand code execution environment 110 (e.g., standard routines), and/or provided by third parties. In some embodiments, such resource-level constraints (e.g., how much memory is to be allocated for executing a particular user code) are specified for the particular user code, and may not vary over each execution of the user code. In such cases, the on-demand code execution environment 110 may have access to such resource-level constraints before each individual request is received, and the individual requests may not specify such resource-level constraints. In some embodiments, the user request may specify other constraints such as permission data that indicates what kind of permissions that the request has to execute the user code. Such permission data may be used by the on-demand code execution environment 110 to access private resources (e.g., on a private network).

In some embodiments, the user request may specify the behavior that should be adopted for handling the user request. In such embodiments, the user request may include an indicator for enabling one or more execution modes in which the user code associated with the user request is to be executed. For example, the request may include a flag or a header for indicating whether the user code should be executed in a debug mode in which the debugging and/or logging output that may be generated in connection with the execution of the user code is provided back to the user (e.g., via a console user interface). In such an example, the on-demand code execution environment 110 may inspect the request and look for the flag or the header, and if it is present, the on-demand code execution environment 110 may modify the behavior (e.g., logging facilities) of the container in which the user code is executed, and cause the output data to be provided back to the user. In some embodiments, the behavior/mode indicators are added to the request by the user interface provided to the user by the on-demand code execution environment 110. Other features such as source code profiling, remote debugging, etc. may also be enabled or disabled based on the indication provided in the request.

Warming Pool Manager

The warming pool manager 135 ensures that virtual machine instances are ready to be used by the worker managers when the on-demand code execution environment 110 receives a request to execute user code on the on-demand code execution environment 110. In the example illustrated in FIG. 1, the warming pool manager 135 manages the warming pool 135A, which is a group (sometimes referred to as a pool) of pre-initialized and pre-configured virtual machine instances that may be used to service incoming user code execution requests. In some embodiments, the warming pool manager 135 causes virtual machine instances to be booted up on one or more physical computing machines within the on-demand code execution environment 110 and added to the warming pool 135A. In other embodiments, the warming pool manager 135 communicates with an auxiliary virtual machine instance service to create and add new instances to the warming pool 135A. For example, the warming pool manager 135 may cause additional instances to be added to the warming pool 135A based on the available capacity in the warming pool 135A to service incoming calls. As will be described below, the warming pool manager 135 may further work in conjunction with other components of the on-demand code execution environment 110, such as the worker manager 140, to add or otherwise manage instances and/or containers in the warming pool based on received pre-trigger notifications.

In some embodiments, the warming pool manager 135 may utilize both physical computing devices within the on-demand code execution environment 110 and one or more virtual machine instance services to acquire and maintain compute capacity that can be used to service code execution requests received by the load balancer 120 and/or the frontends 130. In some embodiments, the on-demand code execution environment 110 may comprise one or more logical knobs or switches for controlling (e.g., increasing or decreasing) the available capacity in the warming pool 135A. For example, a system administrator may use such a knob or switch to increase the capacity available (e.g., the number of pre-booted instances) in the warming pool 135A during peak hours. In some embodiments, virtual machine instances in the warming pool 135A can be configured based on a predetermined set of configurations independent from a specific user request to execute a user's code. The predetermined set of configurations can correspond to various types of virtual machine instances to execute user codes. The warming pool manager 135 can optimize types and numbers of virtual machine instances in the warming pool 135A based on one or more metrics related to current or previous user code executions.

As shown in FIG. 1, instances may have operating systems (OS) and/or language runtimes loaded thereon. For example, the warming pool 135A managed by the warming pool manager 135 comprises instances 152 and 154. The instance 152 includes an OS 152A and a runtime 152B. The instance 154 includes an OS 154A. In some embodiments, the instances in the warming pool 135A may also include containers (which may further contain copies of operating systems, runtimes, user codes, etc.), which are described in greater detail below. Although the instance 152 is shown in FIG. 1 to include a single runtime, in other embodiments, the instances depicted in FIG. 1 may include two or more runtimes, each of which may be used for running a different user code. In some embodiments, the warming pool manager 135 may maintain a list of instances in the warming pool 135A. The list of instances may further specify the configuration (e.g., OS, runtime, container, etc.) of the instances.

In some embodiments, the virtual machine instances in the warming pool 135A may be used to serve any user's request. In one embodiment, all the virtual machine instances in the warming pool 135A are configured in the same or substantially similar manner. In another embodiment, the virtual machine instances in the warming pool 135A may be configured differently to suit the needs of different users. For example, the virtual machine instances may have different operating systems, different language runtimes, and/or different libraries loaded thereon. In yet another embodiment, the virtual machine instances in the warming pool 135A may be configured in the same or substantially similar manner (e.g., with the same OS, language runtimes, and/or libraries), but some of those instances may have different container configurations. For example, two instances may have runtimes for both Python and Ruby, but one instance may have a container configured to run Python code, and the other instance may have a container configured to run Ruby code. In some embodiments, multiple warming pools 130A, each having identically-configured virtual machine instances, are provided.

The warming pool manager 135 may pre-configure the virtual machine instances in the warming pool 135A, such that each virtual machine instance is configured to satisfy at least one of the operating conditions that may be requested or specified by the user request to execute program code on the on-demand code execution environment 110. In one embodiment, the operating conditions may include program languages in which the potential user codes may be written. For example, such languages may include Java, JavaScript, Python, Ruby, and the like. In some embodiments, the set of languages that the user codes may be written in may be limited to a predetermined set (e.g., set of 4 languages, although in some embodiments sets of more or less than four languages are provided) in order to facilitate pre-initialization of the virtual machine instances that can satisfy requests to execute user codes. For example, when the user is configuring a request via a user interface provided by the on-demand code execution environment 110, the user interface may prompt the user to specify one of the predetermined operating conditions for executing the user code. In another example, the service-level agreement (SLA) for utilizing the services provided by the on-demand code execution environment 110 may specify a set of conditions (e.g., programming languages, computing resources, etc.) that user requests should satisfy, and the on-demand code execution environment 110 may assume that the requests satisfy the set of conditions in handling the requests. In another example, operating conditions specified in the request may include: the amount of compute power to be used for processing the request; the type of the request (e.g., API call, HTTP packet transmission, detection of a specific data at an auxiliary service, etc.); the timeout for the request (e.g., threshold time after which an execution of a program code may be terminated); security policies (e.g., may control which instances in the warming pool 135A are usable by which user); scheduling information (e.g., the time by which the on-demand code execution environment is requested to execute the program code, the time after which the on-demand code execution environment is requested to execute the program code, the temporal window within which the on-demand code execution environment is requested to execute the program code, etc.), among other specified conditions.

Worker Manager

The worker manager ring 140 of FIG. 1 includes worker managers 140A, 140B, 140C, 140D, 140E, and 140F. The worker manager ring is not limited to the configuration illustrated in FIG. 1, and the worker manager ring may include fewer or more components. For example, the worker manager ring can include any number of worker managers, and each worker manager can manage any number of virtual machine instances.

A worker manager manages the instances used for servicing incoming code execution requests. In the example illustrated in FIG. 1, each worker manager may manage a group (sometimes referred to as a pool or an active pool) of virtual machine instances, implemented by one or more physical host computing devices, that are currently assigned to one or more users. Although the virtual machine instances are described here as being assigned to a particular user, in some embodiments, the instances may be assigned to a group of users, such that the instance is tied to the group of users and any member of the group can utilize resources on the instance. For example, the users in the same group may belong to the same security group (e.g., based on their security credentials) such that executing one member's code in a container on a particular instance after another member's code has been executed in another container on the same instance does not pose security risks. Similarly, a worker manager may assign the instances and the containers according to one or more policies that dictate which requests can be executed in which containers and which instances can be assigned to which users. An example policy may specify that instances are assigned to collections of users who share the same account (e.g., account for accessing the services provided by the on-demand code execution environment 110). In some embodiments, the requests associated with the same user group may share the same containers (e.g., if the user codes associated therewith are identical). In some embodiments, a request does not differentiate between the different users of the group and simply indicates the group to which the users associated with the requests belong.

Definition of Containers

In the example illustrated in FIG. 1, user codes are executed in isolated compute systems referred to as containers. Containers are logical units created within a virtual machine instance using the resources available on that instance. For example, a worker manager may, based on information specified in the request to execute user code, create a new container or locate an existing container in one of the instances in an active pool (e.g., a group of virtual machine instances, implemented by one or more physical host computing devices, that are currently assigned to one or more users) and assigns the container to the request to handle the execution of the user code associated with the request. In one embodiment, such containers are implemented as Linux containers. The virtual machine instances in the active pool may have one or more containers created thereon and have one or more program codes associated with the user loaded thereon (e.g., either in one of the containers or in a local cache of the instance).

In some embodiments, the sizes of the containers may be 64 MB or any multiples thereof. In other embodiments, the sizes of the containers may be any arbitrary size smaller than or equal to the size of the instances in which the containers are created. In some embodiments, the sizes of the containers may be any arbitrary size smaller than, equal to, or larger than the size of the instances in which the containers are created. By how much the sizes of the containers can exceed the size of the instance may be determined based on how likely that those containers might be utilized beyond the capacity provided by the instance.

Code Execution

After a request has been successfully processed by the load balancer 120 and the frontend 130, the worker manager designated to handle the request finds capacity to service the request to execute user code on the on-demand code execution environment 110. For example, if there exists a particular virtual machine instance in the active pool that has a container with the same user code loaded therein, the worker manager may assign the container to the request and cause the user code to be executed in the container. Alternatively, if the user code is available in the local cache of one of the virtual machine instances, the worker manager may create a new container on such an instance, assign the container to the request, and cause the user code to be loaded and executed in the container. Otherwise, the worker manager may assign a new virtual machine instance to the user associated with the request from the pool of pre-initialized and pre-configured virtual machine instances, download the user code onto a container created on the virtual machine instance, and cause the user code to be executed in the container.

User Code not Found

If the worker manager handling a code execution request determines that the user code associated with the request is not found on any of the instances (e.g., either in a container or the local cache of an instance) in the active pool, the worker manager may determine whether any of the instances in the active pool is currently assigned to the user associated with the request and has compute capacity to handle the current request. If there is such an instance, the worker manager may create a new container on the instance and assign the container to the request. Alternatively, the worker manager may further configure an existing container on the instance assigned to the user, and assign the container to the request. For example, the worker manager may determine that the existing container may be used to execute the user code if a particular library demanded by the current user request is loaded thereon. In such a case, the worker manager may load the particular library and the user code onto the container and use the container to execute the user code.

If the active pool does not contain any instances currently assigned to the user, the worker manager pulls a new virtual machine instance from the warming pool 135A, assigns the instance to the user associated with the request, creates a new container on the instance, assigns the container to the request, and causes the user code to be downloaded and executed on the container.

Latency

In some embodiments, the on-demand code execution environment 110 is adapted to begin execution of the user code shortly after it is received (e.g., by the load balancer 120 or frontend 130). A time period can be determined as the difference in time between initiating execution of the user code (e.g., in a container on a virtual machine instance associated with the user) and receiving a request to execute the user code (e.g., received by a frontend). The on-demand code execution environment 110 is adapted to begin execution of the user code within a time period that is less than a predetermined duration. In one embodiment, the predetermined duration is 500 ms. In another embodiment, the predetermined duration is 300 ms. In another embodiment, the predetermined duration is 100 ms. In another embodiment, the predetermined duration is 50 ms. In another embodiment, the predetermined duration is 10 ms. In another embodiment, the predetermined duration may be any value chosen from the range of 10 ms to 500 ms. In some embodiments, the on-demand code execution environment 110 is adapted to begin execution of the user code within a time period that is less than a predetermined duration if one or more conditions are satisfied. For example, the one or more conditions may include any one of: (1) the user code is loaded on a container in the active pool (e.g., active pool managed by the worker manager designated to handle the request) at the time the request is received; (2) the user code is stored in the code cache of an instance in the active pool at the time the request is received; (3) the active pool contains an instance assigned to the user associated with the request at the time the request is received; or (4) the warming pool 135A has capacity to handle the request at the time the request is received. In some embodiments, instead of initiating the requested code execution as soon as the code execution request is received, the on-demand code execution environment 110 may schedule the code execution according to the scheduling information provided by the request. For example, the request may specify a temporal window (e.g., between 3:00 AM to 4:00 AM next Monday) within which the on-demand code execution environment 110 is requested to perform the code execution, and the on-demand code execution environment 110 may schedule the code execution based on certain performance considerations (e.g., workload, latency, etc.).

Downloading of User Code

The user code may be downloaded from an auxiliary service 106 (e.g., a storage service) of FIG. 1. For example, the downloaded data may include user codes uploaded by one or more users, metadata associated with such user codes, or any other data utilized by the on-demand code execution environment 110 to perform one or more techniques described herein. Although only the auxiliary services 106 are illustrated in the example of FIG. 1, the virtual environment 100 may include other levels of storage systems from which the user code may be downloaded. For example, each instance may have one or more storage systems either physically (e.g., a local storage resident on the physical computing system on which the instance is running) or logically (e.g., a network-attached storage system in network communication with the instance and provided within or outside of the on-demand code execution environment 110) associated with the instance on which the container is created. Alternatively, the code may be downloaded from a web-based data store provided an external the storage service.

Using Compute Capacity in Warming Pool

Once a worker manager locates one of the virtual machine instances in the warming pool 135A that can be used to serve the user code execution request, the warming pool manager 135 or the worker manager takes the instance out of the warming pool 135A and assigns it to the user associated with the request. The assigned virtual machine instance is taken out of the warming pool 135A and placed in the active pool. In some embodiments, once the virtual machine instance has been assigned to a particular user, the same virtual machine instance cannot be used to service requests of any other user. This provides security benefits to users by preventing possible co-mingling of user resources. Alternatively, in some embodiments, multiple containers belonging to different users (or assigned to requests associated with different users) may co-exist on a single virtual machine instance. Such an approach may improve utilization of the available compute capacity.

Caching

In some embodiments, the on-demand code execution environment 110 may maintain a separate cache in which user codes are stored to serve as an intermediate level of caching system between the local cache of the virtual machine instances and a network storage external to the on-demand code execution environment 110 (e.g., accessible via the network 104).

Other Duties of Worker Manager

A worker manager may also manage creation, preparation, and configuration of containers within virtual machine instances. Containers are logical units within a virtual machine instance and utilize resources of the virtual machine instances to execute user code. Based on configuration information associated with a request to execute user code, such a container manager can create containers inside a virtual machine instance. In one embodiment, such containers are implemented as Linux containers.

After the user code has been executed, the worker manager may tear down the container used to execute the user code to free up the resources it occupied to be used for other containers in the instance. Alternatively, the worker manager may keep the container running to use it to service additional requests from the same user. For example, if another request associated with the same user code that has already been loaded in the container is received, the request can be assigned to the same container, thereby eliminating the delay associated with creating a new container and loading the user code in the container. In some embodiments, the worker manager may tear down the instance in which the container used to execute the user code was created. Alternatively, the worker manager may keep the instance running to use it to service additional requests from the same user. The determination of whether to keep the container and/or the instance running after the user code is done executing may be based on a threshold time, the type of the user, average request volume of the user, periodicity information (e.g., containers/instances in the active pool not currently executing user code thereon can be (i) kept alive if the periodicity information indicates that additional requests are expected to arrive soon or (ii) terminated if the periodicity information indicates that additional requests are not likely to arrive soon enough to justify keeping the containers/instances alive), and/or other operating conditions. For example, after a threshold time has passed (e.g., 5 minutes, 30 minutes, 1 hour, 24 hours, 30 days, etc.) without any activity (e.g., running of the code), the container and/or the virtual machine instance is shutdown (e.g., deleted, terminated, etc.), and resources allocated thereto are released. In some embodiments, the threshold time passed before a container is torn down is shorter than the threshold time passed before an instance is torn down.

Separation of Codes and Code Executions

Generally, the on-demand code execution environment may maintain a separation between the program codes of each user, to ensure the privacy and security of such program codes (which may include sensitive information, such as passwords, encryption keys, access codes, API keys, etc.). Further, the on-demand code execution environment may maintain a separation between executions of such program codes. For example, the on-demand code execution environment may require that program codes associated with different users be executed on logically or physically separate virtual machines.

Definition of Virtual Machine Instance

As used herein, the term "virtual machine instance" is intended to refer to an execution of software or other executable code that emulates hardware to provide an environment or platform on which software may execute (an "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used, as well.

The execution of program codes on the on-demand code execution environment will now be discussed. Specifically, to execute program codes, the on-demand code execution environment described herein may maintain a pool of pre-initialized virtual machine instances that are ready for use as soon as a user request is received. Due to the pre-initialized nature of these virtual machines, delay (sometimes referred to as latency) associated with executing the user code (e.g., instance and language runtime startup time) can be significantly reduced, often to sub-100 millisecond levels. Illustratively, the on-demand code execution environment may maintain a pool of virtual machine instances on one or more physical computing devices, where each virtual machine instance has one or more software components (e.g., operating systems, language runtimes, libraries, etc.) loaded thereon. When the on-demand code execution environment receives a request to execute the program code of a user, which specifies one or more computing constraints for executing the program code of the user, the on-demand code execution environment may select a virtual machine instance for executing the program code of the user based on the one or more computing constraints specified by the request and cause the program code of the user to be executed on the selected virtual machine instance. The program codes can be executed in isolated containers that are created on the virtual machine instances. Since the virtual machine instances in the pool have already been booted and loaded with particular operating systems and language runtimes by the time the requests are received, the delay associated with finding compute capacity that can handle the requests (e.g., by executing the user code in one or more containers created on the virtual machine instances) is significantly reduced.

The on-demand code execution environment may include a virtual machine instance manager configured to receive user code (threads, programs, etc., composed in any of a variety of programming languages) and execute the code in a highly scalable, low latency manner, without requiring user configuration of a virtual machine instance. Specifically, the virtual machine instance manager can, prior to receiving the user code and prior to receiving any information from a user regarding any particular virtual machine instance configuration, create and configure virtual machine instances according to a predetermined set of configurations, each corresponding to any one or more of a variety of run-time environments. Thereafter, the virtual machine instance manager receives a request to execute code, and identifies a pre-configured virtual machine instance to execute the code based on configuration information associated with the request. The virtual machine instance manager can further cause the identified virtual machine instance to be assigned to the user and to execute the user's code at least partly by creating and configuring a container inside the identified virtual machine instance. Various embodiments for implementing a virtual machine instance manager and executing user code on virtual machine instances is described in more detail in U.S. Pat. No. 9,323,556, entitled "PROGRAMMATIC EVENT DETECTION AND MESSAGE GENERATION FOR REQUESTS TO EXECUTE PROGRAM CODE" and filed Sep. 30, 2014 ("the '556 patent"), the entirety of which is hereby incorporated by reference.

As will be appreciated by one skilled in the art, the embodiments described herein function to improve the functioning of computing devices by enabling those devices to rapidly execute code of many users within an on-demand code execution environment. Moreover, in the context of an on-demand code execution environment, the present disclosure enables the efficient allocation of code executions to execution environments (e.g., virtual machine instances, containers, etc.), while maintaining the privacy or security of the code. Still further, the present disclosure enables users to quickly alter the parameters, resources, or permissions associated with code execution, thus provided increased flexibility and functionality over prior systems. Additionally, the present disclosure provides various concurrency and scaling techniques that enable improved resource utilization and improved replenishment of pre-warmed virtual machine instances. Thus, one skilled in the art will appreciate by virtue of the present disclosure that the embodiments described herein represent a substantial contribution to the technical field of virtual machine usage management, network-based code execution, and to computing devices in general.

Communication with Auxiliary Services

In some embodiments, the on-demand code execution environment 110 may provide data to one or more of the auxiliary services 106 as it services incoming code execution requests. For example, the on-demand code execution environment 110 may communicate with a monitoring service, a logging service, a billing service, etc. (not shown). For example, the auxiliary services 106 may include a monitoring service for managing monitoring information received from the on-demand code execution environment 110, such as statuses of containers and instances on the on-demand code execution environment 110; a logging service for managing logging information received from the on-demand code execution environment 110, such as activities performed by containers and instances on the on-demand code execution environment 110; and a billing service for generating billing information associated with executing user code on the on-demand code execution environment 110 (e.g., based on the monitoring information and/or the logging information managed by the monitoring service and the logging service). In addition to the system-level activities that may be performed by the auxiliary services 106 (e.g., on behalf of the on-demand code execution environment 110) as described above, the auxiliary services 106 may provide application-level services on behalf of the user code executed on the on-demand code execution environment 110. For example, the auxiliary services 106 may monitor and/or log various inputs, outputs, or other data and parameters on behalf of the user code being executed on the on-demand code execution environment 110. Although shown as a single block, the auxiliary services 106 may be provided as separate services.

Health Checks

In some embodiments, a worker manager may perform health checks on the instances and containers managed by the worker manager (e.g., those in the active pool associated with the worker manager). For example, the health checks performed by the worker manager may include determining whether the instances and the containers managed by the worker manager have any issues of (1) misconfigured networking and/or startup configuration, (2) exhausted memory, (3) corrupted file system, (4) incompatible kernel, and/or any other problems that may impair the performance of the instances and the containers. In one embodiment, the worker manager performs the health checks periodically (e.g., every 5 minutes, every 30 minutes, every hour, every 24 hours, etc.). In some embodiments, the frequency of the health checks may be adjusted automatically based on the result of the health checks. In other embodiments, the frequency of the health checks may be adjusted based on user requests. In some embodiments, the worker manager may perform similar health checks on the instances and/or containers in the warming pool 135A. The instances and/or the containers in the warming pool 135A may be managed either together with those instances and containers in the active pool or separately. In some embodiments, in the case where the health of the instances and/or the containers in the warming pool 135A is managed separately from the active pool, the warming pool manager 135, instead of the worker manager, may perform the health checks described above on the instances and/or the containers in the warming pool 135A.

More on Virtual Machine Instances

The virtual machine instances illustrated in FIGS. 1 and 2 are logical in nature and can be implemented by a single or multiple physical computing devices. At least some of the virtual machine instances may be provisioned to provide a variety of different desired conditions depending on the needs of the user. Examples of the types of desired conditions, include but are not limited to: particular operating systems, particular language runtimes, and particular libraries that may be utilized by the user code. Additionally, one or more virtual machine instances may be provisioned generically when a desired operating condition is not specified or is otherwise not available. One skilled in the relevant art will appreciate that the on-demand code execution environment 110 is logical in nature and can encompass physical computing devices from various geographic regions.

Other Considerations

It will be appreciated by those skilled in the art and others that all of the functions described in this disclosure may be embodied in software executed by one or more physical processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storage medium storing the computer executable components such as a CD-ROM, DVD-ROM, or network interface. Further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system to provide scaling of computational capacity on an on-demand code execution environment, the system comprising:
 a non-transitory data store configured to store one or more program codes associated with a client of the on-demand code execution environment;
 one or more hardware computing devices executing a frontend service through specific computer-executable instructions, said frontend service in communication with the non-transitory data store and configured to at least:
  receive a request to execute a program code on the on-demand code execution environment, the request including a client ID identifying the client associated with the program code, the client associated with a set of virtual machine instance managers configured to acquire compute capacity on behalf of the client;
  calculate a first hash value by applying a hash function on the client ID included in the request;
  identify, based on the calculated first hash value, a first virtual machine instance manager on a ring of virtual machine instance managers available on the on-demand code execution environment, the first virtual machine instance manager being in the set of virtual machine instance managers configured to acquire compute capacity on behalf of the client;
  request the first virtual machine instance manager to acquire compute capacity for executing the program code on behalf of the client;
  receive a throttling response from the first virtual machine instance manager, the throttling response indicating that the first virtual machine instance manager is currently overloaded with other code executions being performed on behalf of the client;
  determine whether a maximum concurrency limit of the client is greater than a current concurrency limit of the client, the maximum concurrency limit of the client defining a range of concurrency limits on a number of concurrent code executions allowed to be performed on the on-demand code execution environment on behalf of the client, and the current concurrency limit of the client indicating a current limit on the number of concurrent code executions allowed to be performed on the on-demand code execution environment on behalf of the client;
  in response to determining that the maximum concurrency limit of the client is greater than the current concurrency limit of the client, adjust the current concurrency limit of the client such that at least one additional virtual machine instance manager is assigned to the client, the at least one additional virtual machine instance manager including a second virtual machine instance manager; and
  cause the program code to be executed on behalf of the client on a virtual machine instance acquired by the second virtual machine instance manager.

2. The system of claim 1, wherein the second virtual machine instance manager is associated with a second hash value that is greater than the first hash value, and the second virtual machine instance manager is immediately adjacent to the first virtual machine instance manager on the ring of virtual machine instance managers.

3. The system of claim 1, wherein the frontend service is further configured to store a number of virtual machine instance managers in the set in a local memory associated with the frontend service.

4. The system of claim 1, wherein the frontend service is further configured to request one or more additional virtual machine instance managers to acquire compute capacity for executing the program code on behalf of the client and receive a throttling response from each of the one or more additional virtual machine instance managers prior to adjusting the current concurrency limit of the client.

5. A computer-implemented method to provide scaling of computational capacity on an on-demand code execution environment, the computer-implemented method comprising:
 receiving a request to execute a program code on the on-demand code execution environment, the request including client information identifying a client associated with the program code, the client associated with a set of virtual machine instance managers configured to acquire compute capacity on behalf of the client;
 identifying, using a hash value calculated based on the client information, a first virtual machine manager assigned to the client from the set of virtual machine instance managers;
 requesting the a first virtual machine instance manager in the set of virtual machine instance managers to acquire compute capacity for executing the program code on behalf of the client;
 receiving a response indicating that the first virtual machine instance manager did not successfully acquire compute capacity for executing the program code on behalf of the client;
 causing a second virtual machine instance manager different from the first virtual machine instance manager to be added to the set of virtual machine instance managers configured to acquire compute capacity on behalf of the client; and
 causing the program code to be executed on behalf of the client on a virtual machine instance acquired by the second virtual machine instance manager.

6. The computer-implemented method of claim 5, further comprising:
 calculating a first hash value by applying a hash function to a client ID of the client; and
 identifying the first virtual machine instance manager using the calculated first hash value.

7. The computer-implemented method of claim 5, further comprising requesting one or more remaining virtual machine instance managers in the set to acquire compute capacity for executing the program code on behalf of the client and receiving a throttling response from each of the one or more remaining virtual machine instance managers in the set prior to causing the second virtual machine instance manager to be added to the set.

8. The computer-implemented method of claim 5, wherein each virtual machine instance manager is associated with a per-client concurrency limit on a number of concurrent code executions allowed to be performed for a single client.

9. The computer-implemented method of claim 5, further comprising:
 determining whether a maximum concurrency limit of the client is greater than a current concurrency limit of the client, the maximum concurrency limit of the client defining a range of concurrency limits on a number of concurrent code executions allowed to be performed on the on-demand code execution environment on behalf of the client, and the current concurrency limit of the client indicating a current limit on the number of concurrent code executions allowed to be performed on the on-demand code execution environment on behalf of the client; and
 in response to determining that the maximum concurrency limit of the client is greater than the current concurrency limit of the client, scaling the set of virtual machine instance managers such that a number of virtual machine instance managers in the set is increased based on a number of virtual machine instance managers currently in the set.

10. The computer-implemented method of claim 5, further comprising:
 determining whether an average load across the set of virtual machine instance managers is below a threshold level; and
 in response to determining that the average load is below the threshold level, removing at least one virtual machine instance manager from the set of virtual machine instance managers.

11. The computer-implemented method of claim 5, further comprising storing a number of virtual machine instance managers in the set in a local memory on the on-demand code execution environment.

12. The computer-implemented method of claim 5, further comprising causing a number of virtual machine instance managers in the set to be stored in a local memory accessible by at least one of the virtual machine instance managers in the set.

13. Non-transitory physical computer storage including computer-executable instructions that, when executed by a computing system, cause the computing system to:
 receive a request to execute a program code on an on-demand code execution environment, the request including client information identifying a client associated with the program code, the client associated with a set of virtual machine instance managers configured to acquire compute capacity on behalf of the client;
 identify, using a hash value calculated based on the client information, a first virtual machine manager assigned to the client from the set of virtual machine instance managers;
 request the first virtual machine instance manager in the set of virtual machine instance managers to acquire compute capacity for executing the program code on behalf of the client;
 receive a response indicating that the first virtual machine instance manager did not successfully acquire compute capacity for executing the program code on behalf of the client;
 cause a second virtual machine instance manager different from the first virtual machine instance manager to be added to the set of virtual machine instance managers configured to acquire compute capacity on behalf of the client; and
 cause the program code to be executed on behalf of the client on a virtual machine instance acquired by the second virtual machine instance manager.

14. The non-transitory physical computer storage of claim 13, wherein the instructions further cause the computing system to:
 calculate a first hash value by applying a hash function to a client ID of the client; and
 identify the first virtual machine instance manager using the calculated first hash value.

15. The non-transitory physical computer storage of claim 13, wherein the instructions further cause the computing system to request one or more remaining virtual machine instance managers in the set to acquire compute capacity for executing the program code on behalf of the client and receive a throttling response from each of the one or more remaining virtual machine instance managers in the set prior to causing the second virtual machine instance manager to be added to the set.

16. The non-transitory physical computer storage of claim 13, wherein each virtual machine instance manager is associated with a per-client concurrency limit on a number of concurrent code executions allowed to be performed for a single client.

17. The non-transitory physical computer storage of claim 13, wherein the instructions further cause the computing system to:
determine whether a maximum concurrency limit of the client is greater than a current concurrency limit of the client, the maximum concurrency limit of the client defining a range of concurrency limits on a number of concurrent code executions allowed to be performed on the on-demand code execution environment on behalf of the client, and the current concurrency limit of the client indicating a current limit on the number of concurrent code executions allowed to be performed on the on-demand code execution environment on behalf of the client; and
in response to determining that the maximum concurrency limit of the client is greater than the current concurrency limit of the client, scale the set of virtual machine instance managers such that a number of virtual machine instance managers in the set is increased based on a number of virtual machine instance managers currently in the set.

18. The non-transitory physical computer storage of claim 13, wherein the instructions further cause the computing system to:
determine whether an average load across the set of virtual machine instance managers is below a threshold level; and
in response to determining that the average load is below the threshold level, remove at least one virtual machine instance manager from the set of virtual machine instance managers.

19. The non-transitory physical computer storage of claim 13, wherein the instructions further cause the computing system to store a number of virtual machine instance managers in the set in a local memory on the on-demand code execution environment.

20. The non-transitory physical computer storage of claim 13, wherein the instructions further cause the computing system to cause a number of virtual machine instance managers in the set to be stored in a local memory accessible by at least one of the virtual machine instance managers in the set.

* * * * *